US012598295B2

(12) United States Patent　　(10) Patent No.:　US 12,598,295 B2

Kim　　(45) **Date of Patent:　*Apr. 7, 2026**

(54) INTRA PREDICTION-BASED VIDEO ENCODING/DECODING METHOD AND DEVICE

(71) Applicant: B1 INSTITUTE OF IMAGE TECHNOLOGY, INC., Seoul (KR)

(72) Inventor: Ki Baek Kim, Seoul (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/825,186

(22) Filed: Sep. 5, 2024

(65) Prior Publication Data

US 2024/0430407 A1　　Dec. 26, 2024

Related U.S. Application Data

(63) Continuation of application No. 18/310,013, filed on May 1, 2023, now Pat. No. 12,256,063, which is a (Continued)

(30) Foreign Application Priority Data

Dec. 28, 2018　(KR) ........................ 10-2018-0173164
Dec. 29, 2018　(KR) ........................ 10-2018-0173228

(51) Int. Cl.
　H04N 19/105　　(2014.01)
　H04N 19/159　　(2014.01)
(Continued)

(52) U.S. Cl.
　CPC ......... H04N 19/105 (2014.11); H04N 19/159 (2014.11); H04N 19/176 (2014.11);
(Continued)

(58) Field of Classification Search
　CPC ........................... H04N 19/105; H04N 19/159
　See application file for complete search history.

(56) References Cited

U.S. PATENT DOCUMENTS 9,264,727 B2 * 2/2016 Sasai ...................... H04N 19/91
9,374,582 B2 6/2016 Oh et al.
(Continued)

FOREIGN PATENT DOCUMENTS

CN　　103313055 A　　9/2013
CN　　107925759 A　　4/2018
(Continued)

OTHER PUBLICATIONS

Intra block HEVC screen content coding extensions; Xu; 2016; (Year: 2016).*

(Continued)

*Primary Examiner* — Luis Perez-Fuentes
(74) *Attorney, Agent, or Firm* — NSIP Law

(57) ABSTRACT

A video encoding/decoding method and device according to the present invention may: determine a reference area for the intra prediction of the current block; derive the intra prediction mode of the current block; and decode the current block on the basis of the reference area and the intra prediction mode.

8 Claims, 13 Drawing Sheets

Related U.S. Application Data continuation of application No. 17/165,075, filed on Feb. 2, 2021, now Pat. No. 11,677,933, which is a continuation of application No. 17/079,784, filed on Oct. 26, 2020, now Pat. No. 10,951,886, which is a continuation of application No. PCT/KR2019/018740, filed on Dec. 30, 2019.

(51) Int. Cl.

| | |
|---|---|
| *H04N 19/176* | (2014.01) |
| *H04N 19/184* | (2014.01) |
| *H04N 19/186* | (2014.01) |
| *H04N 19/46* | (2014.01) |
| *H04N 19/593* | (2014.01) |
| *H04N 19/96* | (2014.01) |

(52) U.S. Cl.
CPC ......... *H04N 19/184* (2014.11); *H04N 19/186* (2014.11); *H04N 19/46* (2014.11); *H04N 19/593* (2014.11); *H04N 19/96* (2014.11)

(56) References Cited

U.S. PATENT DOCUMENTS

| | | | |
|---|---|---|---|
| 10,045,027 B2 | 8/2018 | Oh et al. | |
| 10,237,579 B2 * | 3/2019 | Sasai .................... | H04N 19/176 |
| 10,362,331 B2 | 7/2019 | Liu et al. | |
| 10,448,026 B1 | 10/2019 | Xu et al. | |
| 10,742,973 B2 | 8/2020 | Park et al. | |
| 10,798,376 B2 | 10/2020 | Xu et al. | |
| 10,834,420 B2 | 11/2020 | Moon et al. | |
| 10,873,746 B2 | 12/2020 | Ikai et al. | |
| 10,951,886 B2 | 3/2021 | Kim | |
| 10,951,918 B2 * | 3/2021 | Kim .................... | H04N 19/176 |
| 10,965,940 B2 * | 3/2021 | Li ........................ | H04N 19/159 |
| 10,986,347 B2 * | 4/2021 | Xu ........................ | H04N 19/11 |
| 11,153,574 B2 | 10/2021 | Ahn et al. | |
| 11,677,933 B2 * | 6/2023 | Kim .................... | H04N 19/105 |
| | | | 375/240.02 |
| 12,256,063 B2 * | 3/2025 | Kim ........................ | H04N 19/96 |
| 2012/0314766 A1 | 12/2012 | Chien et al. | |
| 2014/0269908 A1 | 9/2014 | Oh et al. | |
| 2014/0314142 A1 | 10/2014 | Oh et al. | |
| 2017/0332078 A1 | 11/2017 | Lim et al. | |
| 2017/0374369 A1 | 12/2017 | Chuang et al. | |
| 2018/0048909 A1 | 2/2018 | Liu et al. | |
| 2018/0115787 A1 | 4/2018 | Koo et al. | |
| 2018/0139443 A1 | 5/2018 | Park et al. | |
| 2018/0160113 A1 | 6/2018 | Jeong et al. | |
| 2018/0205946 A1 | 7/2018 | Zhang et al. | |
| 2018/0324418 A1 | 11/2018 | Koo et al. | |
| 2018/0332284 A1 | 11/2018 | Liu et al. | |
| 2019/0208201 A1 | 7/2019 | Yasugi et al. | |
| 2019/0327466 A1 | 10/2019 | Ikai et al. | |
| 2020/0014934 A1 | 1/2020 | Xu et al. | |
| 2021/0195239 A1 | 6/2021 | Kim | |
| 2021/0385435 A1 | 12/2021 | Han et al. | |

FOREIGN PATENT DOCUMENTS

| | | |
|---|---|---|
| CO | 20200011693 | 10/2020 |
| EP | 3 223 521 A1 | 9/2017 |
| EP | 3 849 183 A1 | 7/2021 |
| EP | 3 905 677 A1 | 11/2021 |
| JP | 2018-64189 A | 4/2018 |
| KR | 10-2013-0050900 A | 5/2013 |
| KR | 10-2014-0022952 A | 2/2014 |
| KR | 10-2018-0064414 A | 6/2018 |
| KR | 10-2018-0080166 A | 7/2018 |
| KR | 10-2018-0131571 A | 12/2018 |
| KR | 10-2018-0135836 A | 12/2018 |
| RU | 2014 111 827 A | 12/2015 |
| RU | 2 584 498 C2 | 5/2016 |
| RU | 2 601 445 C2 | 11/2016 |
| RU | 2 601 843 C2 | 11/2016 |
| RU | 2 619 706 C2 | 5/2017 |
| TW | I564818 B | 1/2017 |
| WO | WO 2012/170812 A1 | 12/2012 |
| WO | WO 2016/195460 A1 | 12/2016 |
| WO | WO 2016/205699 A1 | 12/2016 |
| WO | WO 2017/043786 A1 | 3/2017 |
| WO | WO 2017/086746 A1 | 5/2017 |
| WO | WO 2017/188779 A2 | 11/2017 |
| WO | WO 2017/188780 A2 | 11/2017 |
| WO | WO 2018/066863 A1 | 4/2018 |
| WO | WO 2018/066980 A1 | 4/2018 |
| WO | WO 2018/116925 A1 | 6/2018 |
| WO | WO 2019/190140 A1 | 10/2019 |

OTHER PUBLICATIONS

On reference picture list constrain for intra block copy; Xu; 2015; (Year: 2015).*

Xu, Xiaozhong, et al., "On Reference Picture List Construction for Intra Block Copy", MediaTek Inc., Jun. 2015, (6 Pages in English).

Xu, Xiaozhong, et al., "Intra block HEVC screen content coding extensions", IEEE Journal on Emerging and Selected Topics in Circuits and Systems, 2016, (11 Pages in English).

Xu, Xiaozhong et al., "On reference picture list construction for intra block copy," *JCTVC-U0113, Proceeding of the 19th JCT-VC meeting*, Warsaw, Poland. 2015 (pp. 1-6).

Xu, Xiaozhong, et al., "Intra Block HEVC Screen Content Coding Extensions," *IEEE Journal on Emerging and Selected Topics in Circuits and Systems*, 6,4, 2016 (pp. 409-419).

International Search Report issued on Apr. 9, 2020 in counterpart International Patent Application No. PCT/KR2019/018740 (2 pages in English and 2 pages in Korean).

United States Notice of Allowance issued on Jan. 22, 2021 in related U.S. Appl. No. 17/079,993 (10 pages in English).

Bross, Benjamin et al., "Versatile Video Coding (Draft 3)" JVET of ITU-T SB 16 WP 3 and ISO/IEC JTC 1/SC 29/WG 11, 12$^{th}$ meeting: Macao, CN, Oct. 3-12, 2018., JVET-L1001-v3, (175 pages in English).

Seregin, Vadim, et al. "Neighbor based intra most probable modes list derivation." *JVET Meeting*. (2016).

Zhao, Liang, et al. "CE3-related: MPM based multi-line intra prediction scheme." *JVET 11th meeting, JVET-K0482*. (2018).

Bross, Benjamin, et al. "Versatile Video Coding (Draft 7)" Document: JVET-P2001-vE, Joint Video Experts Team (JVET) of ITU-T SG 16 WP 3 and ISO/IEC JTC 1/SC 29/WG 11, 16$^{th}$ Meeting: Geneva, CH, Oct. 1-11, 2019, (12 pages).

Bross, Benjamin, et al., Versatile Video Coding (Draft 3), Joint Video Experts Team (JVET) of ITU-T SG 16 WP 3 and ISO/IEC JTC 1/SC 29/WG 11, JVET-L1001 (version 11), 12th Meeting: Macao,CN, Dec. 20, 2018. (pp. 1-226, relevant p. pp. 34-36, 70-75).

Bross, Benjamin, et al., Versatile Video Coding (Draft 7), Joint Video Experts Team (JVET) of ITU-T SG 16 WP3 and ISO/IEC JTC 1/SC 29/WG 11, JVET-P2001, 16th Meeting: Geneva, CH, Nov. 14, 2019, (pp. 1-491, relevant p. pp. 67-71, 172-175).

\* cited by examiner

START

DETERMINE REFERENCE REGION FOR INTRA
PREDICTION OF CURRENT BLOCK — S500

DERIVE INTRA PREDICTION MODE OF
CURRENT BLOCK — S510

DECODE CURRENT BLOCK BASED ON
REFERENCE REGION AND INTRA PREDICTION
MODE — S520

END

CLASSIFY PIXELS IN REFERENCE REGIOIN
INTO PREDETERMINED CATEGORY          SA00

SEARCH UNAVAILABLE PIXEL IN REFERENCE REGION          SA10

REPLACE WITH AVAILABLE PIXEL
USING METHOD SET FOR EACH CATEGORY          SA20

CONFIGURE REFERENCE REGION AS AVAILABLE PIXEL          SA30

PERFORM INTRA PREDICTION          SA40

(A)

(B)

(C)

(Step 1)

(B0)

(B1)

(B2)

(Step 2)

(B20)

(B21)

(B22)

(Step 3)

FIG. 12

| Ref_TL | | Ref_T | | | | Ref_TR | | | |
|---|---|---|---|---|---|---|---|---|---|
| TL | T0 | T1 | T2 | T3 | TR0 | TR1 | TR2 | TR3 |
| L0 | a | b | c | d | R0 | | | |
| L1 | e | f | g | h | R1 | | | |
| L2 | i | j | k | l | R2 | | | |
| L3 | m | n | o | p | R3 | | | |
| BL0 | B0 | B1 | B2 | B3 | BR | | | |
| BL1 | | | | | | | | |
| BL2 | | | | | | | | |
| BL3 | | | | | | | | |

Ref_L

Ref_BL

INTRA PREDICTION-BASED VIDEO ENCODING/DECODING METHOD AND DEVICE

CROSS REFERENCE TO RELATED APPLICATIONS

This Application is a continuation of U.S. patent application Ser. No. 18/310,013 filed on May 1, 2023, which is a continuation of U.S. patent application Ser. No. 17/165, 075 filed on Feb. 2, 2021, now U.S. Pat. No. 11,677,933, which is a continuation of U.S. patent application Ser. No. 17/079,784 filed on Oct. 26, 2020, now U.S. Pat. No. 10,951,886, which pursuant to 35 U.S.C. §§ 120 and 365 (c), is a Bypass Continuation of International Application No. PCT/KR2019/018740, filed on Dec. 30, 2019, which claims the benefit under 35 U.S.C. §§ 119(a) and 365(b) of Korean Patent Application No. 10-2018-0173164, filed on Dec. 28, 2018, and Korean Patent Application No. 10-2018-0173228, filed on Dec. 29, 2018 in the Korean Intellectual Property Office, the entire disclosure of which is incorporated herein by reference for all purposes.

TECHNICAL FIELD

The present invention relates to a video encoding/decoding method and apparatus.

BACKGROUND ART

Recently, demand for high-resolution and high-quality images such as high definition (HD) images and ultra high definition (UHD) images is increasing in various application fields, and accordingly, high-efficiency image compression techniques are being discussed.

Various technologies exist, such as the inter prediction technology that predicts pixel values included in a current picture from a picture before or after a current picture using video compression technology, the intra prediction technology that predicts pixel values included in a current picture by using pixel information in a current picture, an entropy encoding technology that allocates a short code to a value with a high frequency of appearance and a long code to a value with a low frequency of appearance. Image data can be effectively compressed by using such image compression technology, and transmitted or stored.

DISCLOSURE

Technical Problem

An object of the present invention is to provide an efficient block division method and apparatus.

An object of the present invention is to provide a method and an apparatus for deriving an intra prediction mode.

An object of the present invention is to provide a method and an apparatus for determining a reference region for intra prediction.

An object of the present invention is to provide an intra prediction method and apparatus according to a component type.

Technical Solution

A method and an apparatus of encoding/decoding an image of the present invention may determine a reference region for intra prediction of a current block, derive an intra prediction mode of the current block, and decode the current block based on the reference region and the intra prediction mode.

In the method and apparatus of encoding/decoding the image of the present invention, the intra prediction modes pre-defined in the encoding/decoding apparatus may be divided into an MPM candidate group and a non-MPM candidate group, and the MPM candidate group may include at least one of a first candidate group or a second candidate group.

In the method and apparatus of encoding/decoding the image of the present invention, the intra prediction mode of the current block may be derived from either the first candidate group or the second candidate group.

In the method and apparatus of encoding/decoding the image of the present invention, the first candidate group may be composed of a default mode pre-defined in the decoding apparatus, and the second candidate group may be composed of a plurality of MPM candidates.

In the method and apparatus of encoding/decoding the image of the present invention, the default mode may be at least one of a planar mode, a DC mode, a vertical mode, a horizontal mode, a vertical mode, or a diagonal mode.

In the method and apparatus of encoding/decoding the image of the present invention, the plurality of MPM candidates may include at least one of an intra prediction mode of a neighboring block, a mode obtained by subtracting n value from the intra prediction mode of the neighboring block, or a mode obtained by adding n value to the intra prediction mode of the neighboring block. Herein, n may mean a natural number of 1, 2, or more.

In the method and apparatus of encoding/decoding the image of the present invention, the plurality of MPM candidates may include at least one of a DC mode, a vertical mode, a horizontal mode, a mode obtained by subtracting or adding m value to the vertical mode, or a mode obtained by subtracting or adding m value to the horizontal mode. Herein, m may be a natural number of 1, 2, 3, 4 or more.

In the method and apparatus of encoding/decoding the image of the present invention, the encoding apparatus may determine a candidate group to which the intra prediction mode of the current block belongs, encode a flag for identifying the candidate group, and the decoding apparatus may select one of the first candidate group or the second candidate group based on a flag signaled from the encoding apparatus.

In the method and apparatus of encoding/decoding the image of the present invention, the derived intra prediction mode may be changed by applying a predetermined offset to the derived intra prediction mode.

In the method and apparatus of encoding/decoding the image of the present invention, the application of the offset may be selectively performed based on at least one of a size, shape, split information, a value of the intra prediction mode, or component type of the current block.

In the method and apparatus of encoding/decoding the image of the present invention, determining the reference region may include searching for an unavailable pixel belonging to the reference region and replacing the unavailable pixel with an available pixel.

In the method and apparatus of encoding/decoding the image of the present invention, the available pixel may be determined based on a bit depth value or may be a pixel adjacent to at least one of a left, right, top, or bottom of the unavailable pixel.

Advantageous Effects

The present invention may improve the efficiency of intra prediction encoding/decoding through adaptive block division.

According to the present invention, prediction may be more accurately and efficiently performed by deriving an intra prediction mode based on an MPM candidate group.

According to the present invention, in the case of a chroma block, by defining an inter-components reference-based prediction mode as a separate group, the intra prediction mode derivation of the chroma block may be more efficiently performed.

According to the present invention, accuracy and efficiency of intra prediction may be improved by replacing unavailable pixels in a reference region for intra prediction with predetermined available pixels.

According to the present invention, the efficiency of inter prediction may be improved based on inter-components reference.

DESCRIPTION OF DRAWINGS

FIG. 12 is an exemplary diagram illustrating a current block and a pixel adjacent thereto as an embodiment to which the present invention is applied.

BEST MODE FOR INVENTION

Figure 1:
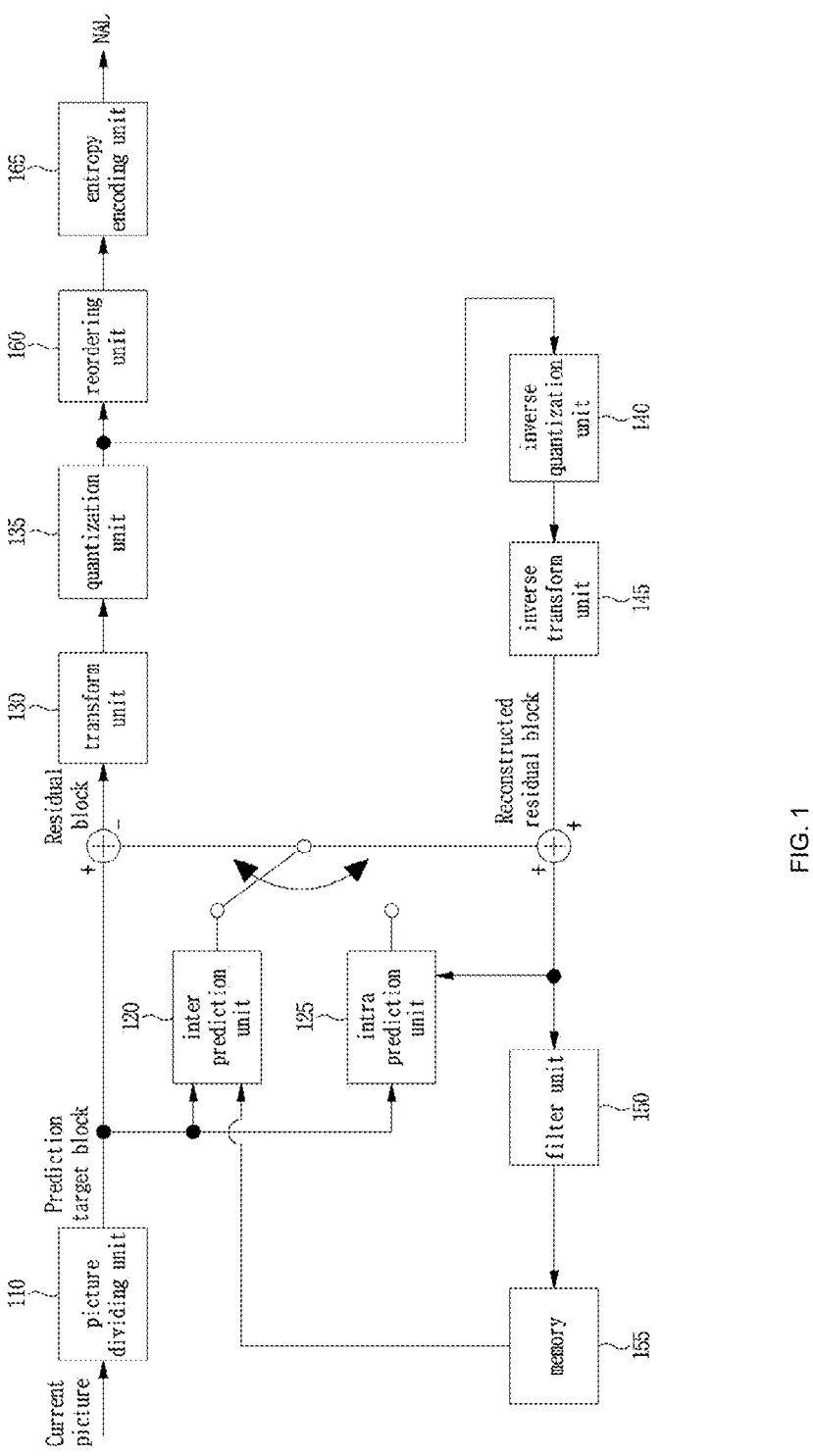
FIG. 1 is a block diagram showing an image encoding apparatus according to an embodiment of the present invention.

A method and an apparatus of encoding/decoding an image of the present invention may determine a reference region for intra prediction of a current block, derive an intra prediction mode of the current block, and decode the current block based on the reference region and the intra prediction mode.

In the method and apparatus of encoding/decoding the image of the present invention, the intra prediction modes pre-defined in the encoding/decoding apparatus may be divided into an MPM candidate group and a non-MPM candidate group, and the MPM candidate group may include at least one of a first candidate group or a second candidate group.

In the method and apparatus of encoding/decoding the image of the present invention, the intra prediction mode of the current block may be derived from either the first candidate group or the second candidate group.

In the method and apparatus of encoding/decoding the image of the present invention, the first candidate group may be composed of a default mode pre-defined in the decoding apparatus, and the second candidate group may be composed of a plurality of MPM candidates.

In the method and apparatus of encoding/decoding the image of the present invention, the default mode may be at least one of a planar mode, a DC mode, a vertical mode, a horizontal mode, a vertical mode, or a diagonal mode.

In the method and apparatus of encoding/decoding the image of the present invention, the plurality of MPM candidates may include at least one of an intra prediction mode of a neighboring block, a mode obtained by subtracting n value from the intra prediction mode of the neighboring block, or a mode obtained by adding n value to the intra prediction mode of the neighboring block. Herein, n may mean a natural number of 1, 2, or more.

In the method and apparatus of encoding/decoding the image of the present invention, the plurality of MPM candidates may include at least one of a DC mode, a vertical mode, a horizontal mode, a mode obtained by subtracting or adding m value to the vertical mode, or a mode obtained by subtracting or adding m value to the horizontal mode. Herein, m may be a natural number of 1, 2, 3, 4 or more.

In the method and apparatus of encoding/decoding the image of the present invention, the encoding apparatus may determine a candidate group to which the intra prediction mode of the current block belongs, encode a flag for identifying the candidate group, and the decoding apparatus may select one of the first candidate group or the second candidate group based on a flag signaled from the encoding apparatus.

In the method and apparatus of encoding/decoding the image of the present invention, the derived intra prediction mode may be changed by applying a predetermined offset to the derived intra prediction mode.

In the method and apparatus of encoding/decoding the image of the present invention, the application of the offset may be selectively performed based on at least one of a size, shape, split information, a value of the intra prediction mode, or component type of the current block.

In the method and apparatus of encoding/decoding the image of the present invention, determining the reference region may include searching for an unavailable pixel belonging to the reference region and replacing the unavailable pixel with an available pixel.

In the method and apparatus of encoding/decoding the image of the present invention, the available pixel may be determined based on a bit depth value or may be a pixel adjacent to at least one of a left, right, top, or bottom of the unavailable pixel.

MODE FOR INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an image encoding apparatus according to an embodiment of the present invention.

Referring to FIG. 1, the image encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and does not mean that each element is made up of separate hardware or one software element. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide the input picture into at least one processing unit. In this case, the processing unit may be a prediction unit (PU), a transform unit (TU), or a coding unit (CU). The picture dividing unit 110 may divide one picture into a plurality of combinations of a coding unit, a prediction unit, and a transformation unit, and select one combination of a coding unit, a prediction unit, and a transformation unit based on a predetermined criterion (for example, a cost function) to encode the picture.

For example, one picture may be divided into a plurality of coding units. In order to divide a picture into the coding units, a recursive tree structure such as a quad tree structure may be used. One image, a maximum coding block (largest coding unit) or a coding tree unit (CTU) as a root may be divided into other coding units, and may be divided with as many child nodes as the number of divided coding units. A coding unit that are no longer divided according to certain restrictions become a leaf node. That is, when it is assumed that only square division is possible for one coding unit, one coding unit may be divided into up to four different coding units.

In the embodiments of the invention, a coding unit may be used to refer to not only a unit of encoding but also a unit of decoding.

The prediction unit may be a block divided in a shape such as at least one square or rectangle of the same size within one coding unit, or one prediction unit among the prediction units divided within one coding unit may have a different shape and/or size from another prediction unit.

When a prediction unit that performs intra prediction based on a coding unit is not a minimum coding unit, intra prediction may be performed without dividing into a plurality of prediction units N×N.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, advanced motion vector prediction (AMVP) mode, and intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to predict luma information or the predicted luma signal information may be used to predict chroma information.

When the size of the prediction unit and the size of the transform unit are the same in performing intra prediction, intra prediction for the prediction unit may be performed based on a pixel on the left, a pixel on the top-left, and a pixel on the top of the prediction unit. However, when the size of the prediction unit and the size of the transform unit are different in performing intra prediction, intra prediction may be performed using a reference pixel determined based on the transform unit. Also, intra prediction using N×N division may be used for only the minimum coding unit.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between a predicted unit generated by the prediction units 120 and 125 and an original block of the prediction unit. The generated residual block may be input to the transform unit 130.

The transform unit 130 may transform the residual block including the residual information between the predicted unit generated by the prediction units 120 and 125 and the original block by using a transform type such as DCT (Discrete Cosine Transform), DST (Discrete Sine Transform), or KLT. Whether to apply DCT, DST, or KLT to transform the residual block may be determined based on intra prediction mode information of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values for the quantized residual.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using Zig-Zag scan method, and change it into a one-dimensional vector form. Depending on the size of the transform unit and the intra prediction mode, instead of zig-zag scan, a vertical scan that scans a two-dimensional block shape coefficient in a column direction and a horizontal scan that scans a two-dimensional block shape coefficient in a row direction may be used. That is, according to the size of the transform unit and the intra prediction mode, it is possible to determine which of a zig-zag scan, a vertical direction scan, and a horizontal direction scan is to be used.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information of a coding unit, prediction mode information, division unit information, prediction unit information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
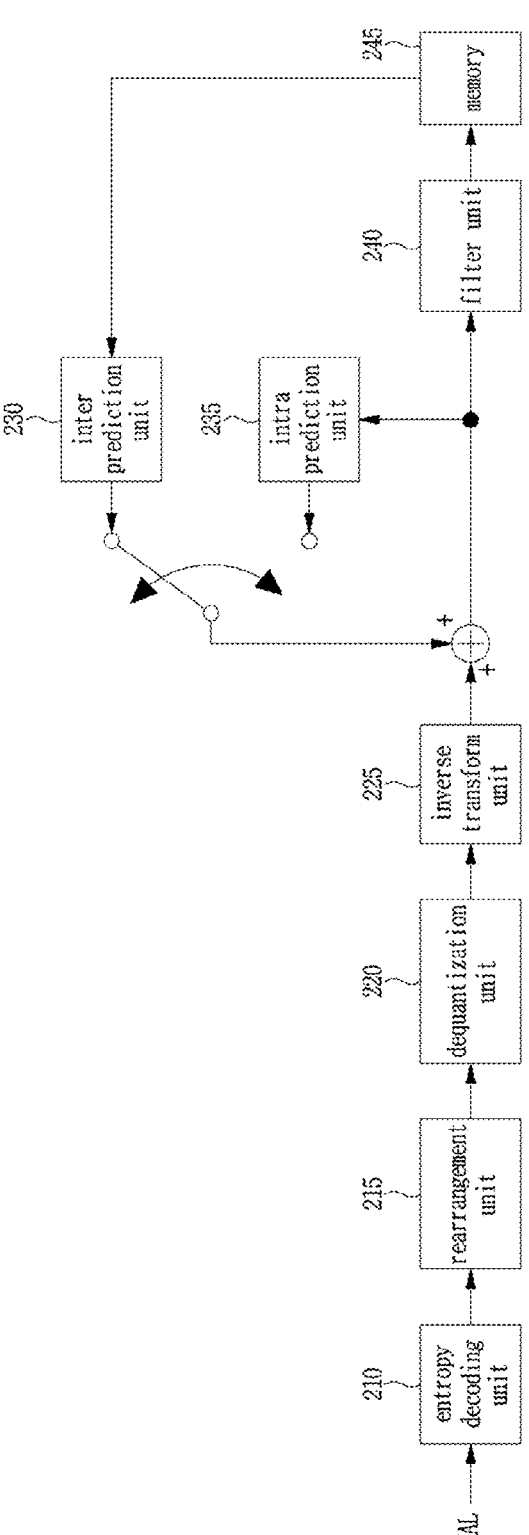
FIG. 2 is a block diagram showing an image decoding apparatus according to an embodiment of the present invention.

FIG. 2 is a block diagram illustrating an image decoding apparatus according an exemplary embodiment of the present invention.

Referring to FIG. 2, the image decoding apparatus 200 may include an entropy decoding unit 210, a rearrangement unit 215, a dequantization unit 220, an inverse transform unit 225, prediction units 230 and 235, a filter unit 240, and a memory 245.

When an image bitstream is input from the image encoding apparatus, the input bitstream may be decoded in a procedure opposite to that of the image encoding apparatus.

The entropy decoding unit 210 may perform entropy decoding in a procedure opposite to that of performing entropy encoding in an entropy encoding unit of an image encoding apparatus. For example, various methods, such as exponential Golomb coding, CAVLC or CABAC, may be applied corresponding to the method performed by the image encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 based on the rearrangement method of the encoding apparatus. The rearrangement unit 215 may reconstruct and rearrange coefficients of a ID vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided by the encoding apparatus and the rearranged coefficients of the block.

The inverse transform unit 225 may perform an inverse transform, that is, an inverse DCT, an inverse DST, and an inverse KLT, with respect to the transform performed by the transform unit, that is, DCT, DST, and KLT on the quantization result performed by the image encoding apparatus. The inverse transform may be performed based on a transmission unit determined by the image encoding apparatus. The inverse transform unit 225 of the image decoding apparatus may selectively perform a transform technique (e.g., DCT, DST, KLT) according to a plurality of pieces of information such as a prediction method, a size of a current block, and a prediction direction.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

As described above, when the size of the prediction unit and the size of the transform unit are the same when intra prediction is performed in the same manner as the operation of the image encoding apparatus, intra prediction for the prediction unit may be performed based on a pixel on the left, a pixel on the top-left, and a pixel on the top of the prediction unit. However, when the size of the prediction unit and the size of the transform unit are different from each other when performing intra prediction, the intra prediction for the prediction unit may be performed using a reference pixel determined based on the transform unit. In addition, intra prediction using N×N division may be used for only the minimum coding unit.

The prediction units 230 and 235 may include a prediction unit determination unit, an inter prediction unit and an intra prediction unit. The prediction unit determination unit may receive a variety of information, such as prediction unit information, prediction mode information of an intra prediction method and motion prediction-related information of an inter prediction method, etc. from the entropy decoding unit 210, may determine a prediction unit for a current coding unit. The prediction unit determination unit may determine which of the inter prediction and the intra prediction is performed on the prediction unit. An inter prediction unit 230 may perform inter prediction on a current prediction unit on the basis of information on at least one picture among a previous picture and a subsequent picture of a current picture including the current prediction unit.

Herein, an inter prediction unit 230 may use information necessary for inter prediction for the current prediction unit provided from the image encoding apparatus. The inter prediction may be performed on the basis of the information of the pre-reconstructed partial region in the current picture including the current prediction unit.

In order to perform inter prediction, it may be determined, in an unit of a coding unit, whether a motion prediction method for a prediction unit included in the coding unit is a skip mode, a merge mode, an AMVP mode or an intra block copy mode.

An intra prediction unit 235 may generate a prediction block on the basis of pixel information in a current picture. When a prediction unit is a prediction unit for which intra prediction is performed, intra prediction may be performed based on intra prediction mode information on the prediction unit provided from the image encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current prediction unit. AIS filtering may be performed on the reference pixels of the current block using the prediction mode for the prediction unit and information on the AIS filter provided from the image encoding apparatus. When the prediction mode for the current block is a mode not performing AIS filtering, the AIS filter may not be applied.

When the prediction mode for the prediction unit indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current prediction unit indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The image encoding apparatus may provide information on whether the deblocking filter is applied to a corresponding block or picture, and information on which of a strong filter and a weak filter is applied when the deblocking filter is used. The deblocking filter of the image decoding apparatus may be provided with information on the deblocking filter from the image encoding apparatus and may perform deblocking filtering on a corresponding block.

The offset unit may apply offset to the reconstructed picture on the basis of information on an offset type and offset value applied to the picture in the encoding process.

The ALF may be applied to a coding unit on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

In this specification, a coding unit, a coding block, a current block, and the like may be interpreted as the same meaning. An embodiment to be described later may be performed by a corresponding unit of the image encoding apparatus and/or the image decoding apparatus.

Figure 3:
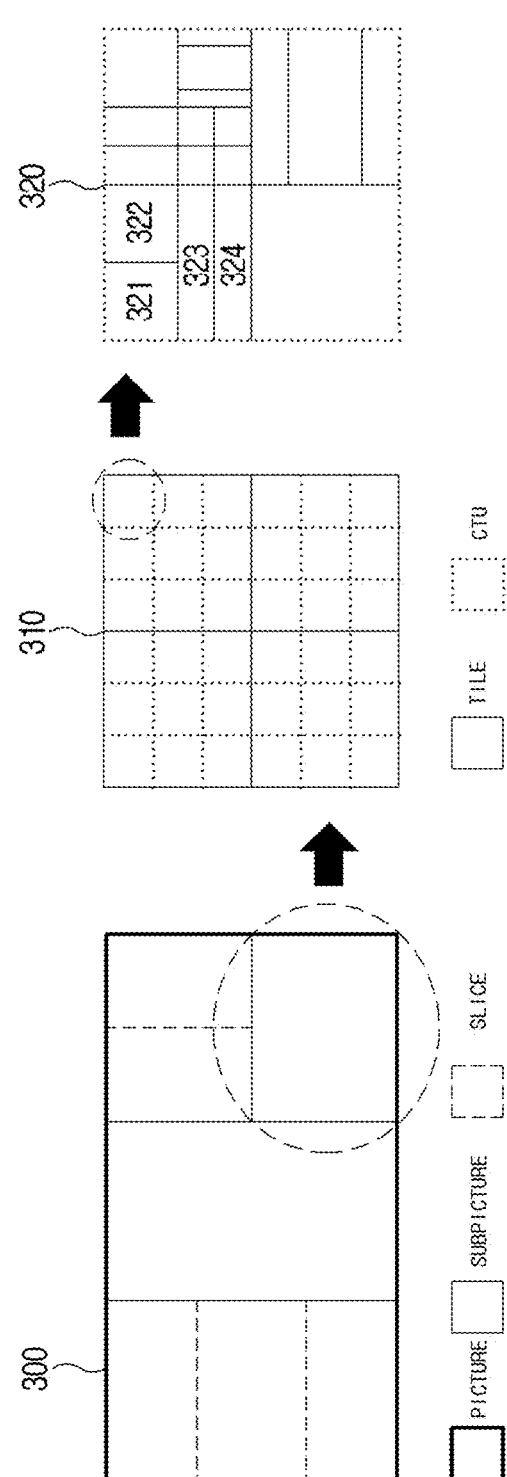
FIG. 3 illustrates a method of dividing a picture into a plurality of fragment regions as an embodiment to which the present invention is applied.

FIG. 3 illustrates a method of dividing a picture into a plurality of fragment regions as an embodiment to which the present invention is applied.

One picture may be divided into a predetermined fragment region. The fragment region according to the present invention may include at least one of a subpicture, a slice, a tile, a coding tree unit (CTU), or a coding unit (CU).

Referring to FIG. 3, a picture 300 may include one or more subpictures. That is, a picture may be composed of one subpicture, or may be divided into a plurality of subpictures as shown in FIG. 3.

In case of the subpicture, division information may be configured differently according to the encoding setting. (1) For example, a subpicture may be obtained in a batch division method based on a vertical or horizontal line crossing the picture. (2) Alternatively, a subpicture may be obtained by a partial division method based on feature information (position, size, shape, etc., as for the shape described later, assuming a rectangular angle) of each subpicture.

(1) In the former case, division information of a subpicture may be configured based on the vertical or horizontal line that divide the subpicture.

The line-based division may use either an uniform or non-uniform division. When the uniform method is used, information on the division number of each line may be generated, and when the non-uniform method is used, distance information (width or height) between lines may be generated. Either an uniform or non-uniform division method may be used depending on the encoding setting, or method selection information may be explicitly generated. Uniform or non-uniform division method may be applied collectively to vertical and horizontal lines. Alternatively, the methods applied to the vertical and horizontal lines is different from each other. Information on the number of subpictures may be derived based on the division information.

The distance information between the lines may be encoded in units such as n-sample units, CTU size, (2*CTU size), (4*CTU size), and the like. Here, n may be a natural number of 4, 8, 16, 32, 64, 128, 256 or more. The generated information may be signaled at least one level of a video parameter set (VPS), a sequence parameter set (SPS), a picture parameter set (PPS), and a picture header (PH).

(2) In the latter case, position information of the subpicture (e.g., information indicating the position of the top-left, top-right, bottom-left, and bottom-right of each subpicture), size information (e.g., information indicating width or height)), information on the number of subpictures, etc. may be used to configure division information of the subpicture.

Information specifying the number of subpictures (hereinafter, number information) may be encoded by the encoding apparatus, and the decoding apparatus may determine the number of subpictures configuring one picture based on the encoded number information. The number information may be signaled at least one level of VPS, SPS, PPS, and PH. Alternatively, the number information of subpictures may be implicitly derived based on division information (position, size information, etc.) of the subpicture.

The information specifying the position of each subpicture (hereinafter, position information) may include an x-coordinate or y-coordinate of a pre-committed position of the corresponding subpicture. The pre-committed position may be determined among the top-left, top-right, bottom-left, and bottom-right of the subpicture. The position information may be encoded by the encoding apparatus, and the decoding apparatus may determine a position of each subpicture based on the encoded position information. Here, the x-coordinate/y-coordinate may be expressed in units such as n-sample units, CTU size, (2*CTU size), (4*CTU size), and the like. Here, n may be a natural number of 1, 2, 4, 8, 16, 32, 64, 128, 256 or more. For example, in case that position information is encoded using the x-coordinate and y-coordinate of the top-left CTU of the subpicture, if the width and height are 2 and 3 respectively in units of CTU (CtbSize), the position (top-left) of the subpicture may be determined as (2*CtbSize, 3*CtbSize).

The information specifying the size of each subpicture (hereinafter, size information) may include at least one of width information and height information of the corresponding subpicture. Here, the width/height information may be encoded in units such as n-sample units, CTU size, (2*CTU size), (4*CTU size), and the like. Here, n may be a natural number of 4, 8, 16, 32, 64, 128, 256 or more. For example, in case that width information is encoded in units of CTU size (CtbSize), if the width information is 6, the width of the subpicture may be determined as (6*CtbSize).

The above-described position information and size information may be limited to be encoded/decoded only when the number of subpictures belonging to a picture is two or more. That is, if the number of subpictures according to the number information is greater than or equal to two, the position information and the size information are signaled. Otherwise, the subpicture may be set to have the same position/size as the picture. However, even when the number of subpictures is two or more, position information for the first subpicture located at the top-left of the picture may not be signaled and may be signaled from position information on the second subpicture. Also, at least one of position information or size information on the last subpicture of the picture may not be signaled.

Referring to FIG. 3, one subpicture may include one or more slices. That is, one subpicture may be composed of one slice or may be divided into a plurality of slices. The subpicture may be composed of a plurality of slices divided in the horizontal direction or may be composed of a plurality of slices divided in the vertical direction.

Information specifying the number of slices belonging to one picture or subpicture (hereinafter, number information) is encoded by the encoding apparatus, and the decoding apparatus may determine the number of subpictures in one picture or subpicture based on the encoded number information. The number information may be signaled at least one level of VPS, SPS, PPS, and PH. However, the number information may be signaled only in at least one of a case where a rectangular slice is allowed or a case where one subpicture is not composed of one slice.

Information specifying the size of each slice (hereinafter, size information) may include at least one of width information and height information of the corresponding slice. Here, the width/height information may be encoded in units of tiles or CTUs.

However, it may not be allowed that one slice is divided so as to overlap a plurality of subpictures. In other words, one subpicture may be divided to completely include one or more slices. Alternatively, a slice constituting one subpicture may be limited to be divided only in either a horizontal direction or a vertical direction.

Referring to FIG. 3, one subpicture or slice 310 may include one or more tiles. That is, one slice may be composed of one tile or may be composed of a plurality of tiles. However, the present invention is not limited thereto, and a plurality of slices may be included in one tile. As an example, one slice may be composed of a subset of a plurality of CTU rows belonging to one tile. In this case, information specifying the number of slices belonging to one tile (hereinafter, number information) is encoded by the encoding apparatus, and the decoding apparatus may determine the number of slices constituting one tile based on the encoded number information. Information specifying the size of each slice (hereinafter, size information) may include at least one of width information and height information of the corresponding slice. Here, the width/height information may be encoded in a unit of a CTU size. However, when one slice is composed of a subset of a plurality of CTU rows, only height information of the corresponding slice may be signaled, and width information may not be signaled. The number/size information may be signaled at least one level of VPS, SPS, PPS, or PH.

At least one of the above-described information on the number, position, and size is required only when the picture is divided into predetermined fragment regions. For example, the information may be signaled only when the picture is divided into a plurality of slices or tiles. To this end, a separate flag indicating whether or not the current picture is divided into a plurality of slices or tiles may be used. The flag may be signaled at least one level of VPS, SPS, PPS, and PH.

Referring to FIG. 3, one tile may be composed of a plurality of CTUs, and one CTU 320 (hereinafter, a first block) may be divided into a plurality of subblocks (hereinafter, a second block) by at least one of a vertical line or a horizontal line. The number of vertical lines and horizontal lines may be one, two, or more. Hereinafter, the first block is not limited to the CTU, and may be a coding block (CU) divided from the CTU, a prediction block (PU) which is a basic unit of predictive encoding/decoding, or a transform block (TU) which is a basic unit of transform encoding/decoding. The first block may be a square block or a non-square block.

The division of the first block may be performed based on not only a quad tree but also a multi-tree such as a binary tree or a ternary tree.

Specifically, a quad tree division (QT) is a division type in which the first block is divided into four second blocks. For example, when the first block of 2N×2N is divided by QT, the first block may be divided into four second blocks having N×N size. QT may be limited to apply to a square block only, but it is also applicable to a non-square block.

A binary tree division (BT) is a division type in which the first block is divided into two second blocks. BT may include a horizontal binary tree (hereinafter, Horizontal BT) and a vertical binary tree (hereinafter, Vertical BT). Horizontal BT is a division type in which the first block is divided into two second blocks by one horizontal line. This division may be performed symmetrically or asymmetrically. For example, when the first block of 2N×2N is divided based on Horizontal BT, the first block may be divided into two second blocks with a height ratio of (a:b). Here, a and b may be the same value, and a may be larger or smaller than b. Vertical BT is a division type in which the first block is divided into two second blocks by one vertical line. This division may be performed symmetrically or asymmetrically. For example, when the first block of 2N×2N is divided based on Vertical BT, the first block may be divided into two second blocks with a width ratio of (a:b). Here, a and b may be the same value, and a may be larger or smaller than b.

A ternary tree division (TT) is a division type in which the first block is divided into three second blocks. Likewise, TT may include a horizontal ternary tree (hereinafter, Horizontal TT) and a vertical ternary tree (hereinafter, Vertical TT). Horizontal TT is a division type in which the first block is divided into three second blocks by two horizontal lines. For example, when the first block of 2N×2N is divided based on Horizontal TT, the first block may be divided into three second blocks with a height ratio of (a:b:c). Here, a, b, and c may be the same value. Alternatively, a and c may be the same, and b may be greater or less than a. For example, a and c may be 2, and b may be 1. Vertical TT is a division type in which the first block is divided into three second blocks by two vertical lines. For example, when the first block of 2N×2N is divided based on Vertical TT, the first block may be divided into three second blocks with a width ratio of (a:b:c). Here, a, b, and c may be the same value or different values. Alternatively, a and c may be the same while b may be greater or less than a. Alternatively, a and b may be the same while c may be greater or less than a. Alternatively, b and c are the same while a may be larger or smaller than b. For example, a and c may be 2, and b may be 1.

The division described above may be performed based on the division information signaled from the encoding apparatus. The division information may include at least one of division type information, division direction information, or division ratio information.

The division type information may specify any one of the division types that are pre-defined in the encoding/decoding apparatus. The pre-defined division type may include at least one of QT, Horizontal BT, Vertical BT, Horizontal TT, Vertical TT, or non-division mode (No split). Alternatively, the division type information may mean information on whether or not QT, BT, or TT is applied, and may be encoded in the form of a flag or an index. As an example, the division type information may include at least one of a first flag indicating whether QT is applied or a second flag indicating whether BT or TT is applied. Either BT or TT may be selectively used according to the second flag. However, the first flag may be signaled only when the size of the first block is less than or equal to a predetermined threshold size. The threshold size may be a natural number of 64, 128 or more. When the size of the first block is greater than the threshold size, the first block may be forced to be divided using only QT. In addition, the second flag may be signaled only when QT is not applied according to the first flag.

In the case of BT or TT, the division direction information may indicate whether it is divided horizontally or vertically. In the case of BT or TT, the division ratio information may indicate the ratio of the width and/or the height of the second block.

The block 320 illustrated in FIG. 3 is assumed to be a square block (hereinafter, a first block) having a size of 8N×8N and a division depth of k. When the division information of the first block indicates QT division, the first block may be divided into four sub-blocks (hereinafter, a second block). The second block may have a size of 4N×4N and may have a division depth of (k+1).

The four second blocks may be divided again based on either QT, BT, TT, or non-division mode. For example, when the division information of the second block indicates Horizontal BT, the second block is divided into two sub-blocks (hereinafter, a third block). In this case, the third block may have a size of 4N×2N and may have a division depth of (k+2).

The third block may also be divided again based on either QT, BT, TT, or non-division mode. For example, when the division information of the third block indicates Vertical BT, the third block is divided into two sub-blocks 321 and 322.

In this case, the sub-blocks 321 and 322 may have a size of 2N×2N and a division depth of (k+3). Alternatively, when the division information of the third block indicates Horizontal BT, the third block may be divided into two sub-blocks 323 and 324. In this case, the sub-blocks 323 and 324 may have a size of 4N×N and a division depth of (k+3).

The division may be performed independently or in parallel with the neighboring block, or may be performed sequentially according to a predetermined priority order.

The division information of the current block may be determined depending on at least one of the division information of the upper block of the current block or the division information of the neighboring block. For example, when the second block is divided based on Horizontal BT and the upper third block is divided based on Vertical BT, the lower third block does not need to be divided based on Vertical BT. If the lower third block is divided by Vertical BT, this is the same result as the second block is divided by QT. Therefore, encoding for the division information (particularly, the division direction information) of the lower third block may be skipped, and the decoding apparatus may be set so that the lower third block is divided in the horizontal direction.

The upper block may mean a block having a smaller division depth than the division depth of the current block. For example, when the division depth of the current block is (k+2), the division depth of the upper block may be (k+1). The neighboring block may be a block adjacent to the top or left side of the current block. The neighboring block may be a block having the same division depth as the current block.

The above-described division may be repeatedly performed up to the minimum unit of encoding/decoding. When divided into the minimum unit, the division information for the block is no longer signaled from the encoding apparatus. The information on the minimum unit may include at least one of a size or a shape of the minimum unit. The size of the minimum unit may be expressed by the width, the height, the minimum or maximum value of the width and height, the sum of the width and height, the number of pixels, or the division depth. The information on the minimum unit may be signaled in at least one of a video sequence, a picture, a slice, or a block unit. Alternatively, the information on the minimum unit may be a value pre-defined in the encoding/decoding apparatus. The information on the minimum unit may be signaled for each of CU, PU, and TU. Information on one minimum unit may be applied to CU, PU, and TU equally. Blocks in the embodiments described below may be obtained through the above-described block division.

Block division according to an embodiment of the present invention may be obtained within a supportable range, and block division setting information for this may be supported. For example, block division setting information may include m×n size relating to the maximum coding block (CTU), the minimum coding block, the maximum transform block, and the minimum transform block (e.g., m and n are natural numbers such as 2, 4, 8, 16, 32, 64, 128, etc.) and the maximum division depth of k for each block (e.g., encoding/transform×Intra/Inter×QT/BT/TT, etc. k is 0, 1, 2 or more). And, it may be signaled at least one level of VPS, SPS, PPS, PH, or a slice header.

In the case of some of the above-described fragment regions (subpicture, slice, tile, etc.), in order to segment/divide each fragment region (for example, to derive position and size information of the fragment region), predetermined base information (for example, information on a lower or base unit of a corresponding fragment region such as a CTU or a tile) may be requested. In this case, the VPS-SPS-PPS may be sequentially progressed, but for simultaneous encoding/decoding, it may be necessary to provide the base information at a level that supports segmentation/division of each fragment region.

For example, CTU information may be generated (fixedly generated) in SPS, and CTU information may be used (when divided) according to whether to divide into subpictures (assumed to be processed in SPS). Alternatively, CTU information may be generated (when divided, additionally generated) according to whether to divide into slices or tiles (assumed to be processed in PPS), and it may be divided into slices and tiles based on this.

In summary, base information used for segmentation/division of a fragment image may be generated at one level. Alternatively, base information used for segmentation/division may be generated at two or more levels according to the type of fragment image.

Regardless of the type of the fragment image, base information (syntax or flag) referenced to the segment of the fragment image may be generated at one level. Alternatively, base information referenced to a segment of each fragment image may be generated at a plurality of levels according to the fragment image. In this case, even if the base information may occur and exist at two or more levels, the same effect as occurring and existing at one level may be maintained by setting to have the same value or information with each other. However, in the case of the base information, it may be a default setting to have the same value or information, but it is not limited thereto, and it may be possible to change them to have different values or information.

Figure 4:
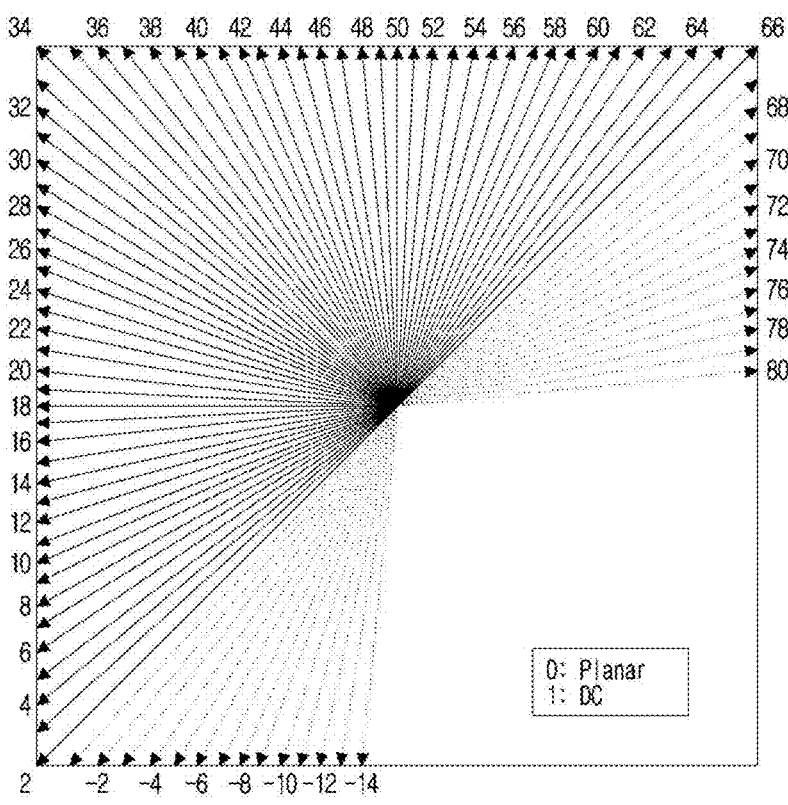
FIG. 4 is an exemplary diagram illustrating an intra prediction mode pre-defined in an image encoding/decoding apparatus as an embodiment to which the present invention is applied.

FIG. 4 is an exemplary diagram illustrating an intra prediction mode pre-defined in an image encoding/decoding apparatus as an embodiment to which the present invention is applied.

Referring to FIG. 4, the pre-defined intra prediction modes may be defined as a prediction mode candidate group composed of 67 modes, and specifically may include 65 directional modes (Nos. 2 to 66) and two non-directional modes (DC, Planar). In this case, the directional mode may be identified based on a slope (e.g., dy/dx) or angle information (Degree). All or some of the intra prediction modes described in the above example may be included in the prediction mode candidate group of the luma component or the chroma component, and other additional modes may be included in the prediction mode candidate group.

In addition, a reconstructed block of another color space that has been encoded/decoded using correlation between color spaces may be used for prediction of the current block, and a prediction mode supporting this may be included. For example, in the case of a chroma component, a prediction block of the current block may be generated by using a reconstructed block of a luma component corresponding to the current block. That is, a prediction block may be generated based on the reconstructed block, by considering correlation between color spaces.

The prediction mode candidate group may be adaptively determined according to the encoding/decoding setting. The number of candidate groups may be increased for the purpose of improving the accuracy of prediction, and the number of candidate groups may be decreased for the purpose of reducing the amount of bits according to the prediction mode.

For example, one of candidate group A (67, 65 directional modes and 2 non-directional modes), candidate group B (35, 33 directional modes and 2 non-directional modes), or candidate group C (18, 17 directional modes and one non-directional mode) may be selected, and the candidate group may be adaptively selected or determined based on the size and shape of the block.

In addition, it is possible to have various configurations of the prediction mode candidate group according to the encoding/decoding setting. For example, as shown in FIG. 4, the prediction mode candidate group may be configured so that a mode interval is even, or the prediction mode candidate group may be configured so that the number of modes between modes 18 and 34 in FIG. 4 is greater than the number of modes between modes 2 and 18. The opposite case may be possible. The candidate group may be adaptively configured according to the shape of the block (i.e., square, non-square with a width greater than a height, non-square with a height greater than a width, etc.).

For example, when the width of the current block is greater than the height, all or some of the intra prediction modes belonging to modes 2 to 18 may not be used, and may be replaced with all or some of the intra prediction modes belonging to modes 67 to 80. On the other hand, when the width of the current block is less than the height, all or some of the intra prediction modes belonging to modes 50 to 66 may not be used, and may be replaced with all or some of the intra prediction modes belonging to modes −14 to −1.

In the present invention, unless otherwise specified, it is assumed that intra prediction is performed with one preset prediction mode candidate group (candidate group A) having an uniform mode interval, but the main elements of the present invention may be also applied to an adaptive intra prediction settings.

Figure 5:
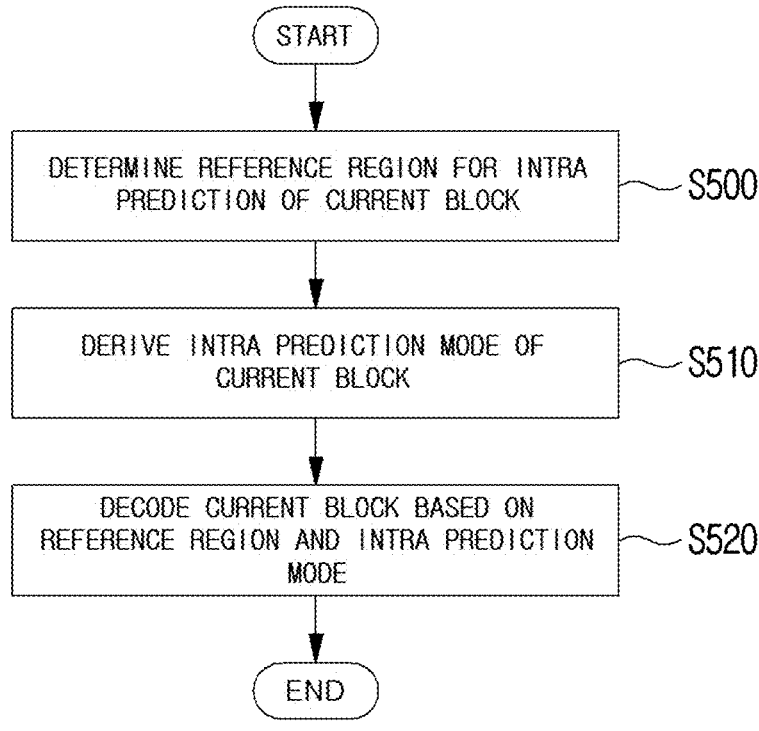
FIG. 5 illustrates a method of decoding a current block based on intra prediction as an embodiment to which the present invention is applied.

FIG. 5 illustrates a method of decoding a current block based on intra prediction as an embodiment to which the present invention is applied.

Referring to FIG. 5, a reference region for intra prediction of a current block may be determined (S500).

The reference region according to the present invention may be a region adjacent to at least one of the left, top, top-left, bottom-left, or top-right of the current block. In addition, although not shown in FIG. 5, the reference region may further include a region adjacent to at least one of the right, bottom-right, or bottom of the current block, and may be selectively used based on an intra prediction mode of the current block, an encoding/decoding order, a scan order, etc.

The encoding/decoding apparatus may define a plurality of pixel lines available for intra prediction. The plurality of pixel lines may include at least one of a first pixel line adjacent to the current block, a second pixel line adjacent to the first pixel line, a third pixel line adjacent to the second pixel line, or a fourth pixel line adjacent to the third pixel line.

For example, depending on the encoding/decoding setting, the plurality of pixel lines may include all of the first to fourth pixel lines, or may include only the remaining pixel lines except for the third pixel line. Alternatively, the plurality of pixel lines may include only the first pixel line and the fourth pixel line, or may include only the first to third pixel lines.

The current block may select one or more of the plurality of pixel lines and use this as a reference region. In this case, the selection may be performed based on an index (refIdx) signaled from the encoding apparatus. Alternatively, the selection may be performed based on predetermined encoding information. Here, the encoding information may include at least one of the size, shape, and division type of the current block, whether the intra prediction mode is a non-directional mode, whether the intra prediction mode is horizontal directionality, an angle of the intra prediction mode or a component type.

For example, when the intra prediction mode is a planar mode or a DC mode, only the first pixel line may be limited to be used. Alternatively, when the size of the current block is less than or equal to a predetermined threshold value, only the first pixel line may be limited to be used. Here, the size may be expressed as any one of the width or height of the current block (e.g., maximum value, minimum value, etc.), the sum of the width and height, or the number of samples belonging to the current block. Alternatively, when the intra prediction mode has an angle greater than a predetermined threshold angle (or smaller than a predetermined threshold angle), only the first pixel line may be used. The threshold angle may be an angle of an intra prediction mode corresponding to mode 2 or mode 66 in the aforementioned prediction mode candidate group.

Meanwhile, there may be a case in which at least one of the pixels of the reference region is not available, and in this case, the unavailable pixel may be replaced with a predetermined default value or an available pixel. This will be described in detail with reference to FIG. 6. Referring to FIG. 5, an intra prediction mode of a current block may be derived (S510).

The current block is a concept including a luma block and a chroma block, and the intra prediction mode may be determined for each of a luma block and a chroma block. Hereinafter, it is assumed that the intra prediction mode pre-defined in the decoding apparatus is composed of non-directional modes (Planar mode, DC mode) and 65 directional modes.

1. In Case of Luma Block

The above-described pre-defined intra prediction modes may be divided into an MPM candidate group and a non-MPM candidate group. The intra prediction mode of the current block may be derived by selectively using either the MPM candidate group or the non-MPM candidate group. To this end, a flag (hereinafter, a first flag) indicating whether the intra prediction mode of the current block is derived from the MPM candidate group may be used. For example, when the first flag is a first value, the MPM candidate group may be used, and when the first flag is a second value, the non-MPM candidate group may be used.

Specifically, when the first flag is the first value, the intra prediction mode of the current block may be determined based on the MPM candidate group (candModeList) including at least one MPM candidate and an MPM index. The MPM index may be information specifying any one of MPM candidates belonging to the MPM candidate group. The MPM index may be signaled only when a plurality of MPM candidates belong to the MPM candidate group.

On the other hand, when the first flag is a second value (that is, when the same MPM candidate as the intra prediction mode of the current block does not exist in the MPM candidate group), the intra prediction mode of the current block may be determined based on the signaled remaining mode information. The remaining mode information may specify any one of the remaining modes except for the MPM candidate.

Hereinafter, a method of determining the MPM candidate group will be described.

(Embodiment 1) The MPM candidate group may include at least one of an intra prediction mode of a neighboring block (modeA), modeA−n, modeA+n, or a default mode. The n value may be an integer of 1, 2, 3, 4 or more. The neighboring block may mean a block adjacent to a left and/or top of the current block. However, the present invention is not limited thereto, and the neighboring block may include at least one of a top-left neighboring block, a bottom-left neighboring block, or a top-right neighboring block. The default mode may be at least one of a planar mode, a DC mode, or a predetermined directional mode. The predetermined directional mode may include at least one of a horizontal mode (modeV), a vertical mode (modeH), mode V−k, mode V+k, modeH−k, or modeH+k. Here, k may be an integer of 1, 2, 3, 4, 5, or more.

The MPM index may specify the same MPM as the intra prediction mode of the current block among MPMs of the MPM candidate group. That is, the MPM specified by the MPM index may be set as the intra prediction mode of the current block.

(Embodiment 2) The MPM candidate group may be divided into m candidate groups. m may be an integer of 2, 3, 4 or more. Hereinafter, for convenience of description, it is assumed that the MPM candidate group is divided into a first candidate group and a second candidate group.

The encoding/decoding apparatus may select either the first candidate group or the second candidate group. The selection may be performed based on a flag (hereinafter, a second flag) that specifies whether the intra prediction mode of the current block belongs to the first candidate group or the second candidate group. For example, if the second flag is a first value, the intra prediction mode of the current block may be derived from the first candidate group, otherwise, the intra prediction mode of the current block may be derived from the second candidate group.

Specifically, when the first candidate group is used according to the second flag, a first MPM index specifying any one of a plurality of default modes belonging to the first candidate group may be signaled. The default mode corresponding to the signaled first MPM index may be set as the intra prediction mode of the current block. On the other hand, when the first candidate group is composed of one default mode, the first MPM index is not signaled, and the intra prediction mode of the current block may be set as the default mode of the first candidate group.

When the second candidate group is used according to the second flag, a second MPM index specifying any one of a plurality of MPM candidates belonging to the second candidate group may be signaled. The MPM candidate corresponding to the signaled second MPM index may be set as an intra prediction mode of the current block. On the other hand, when the second candidate group is composed of one MPM candidate, the second MPM index is not signaled, and the intra prediction mode of the current block may be set as the MPM candidate of the second candidate group.

Meanwhile, the second flag may be signaled only when the above-described first flag is a first value (condition 1). Also, the second flag may be signaled only when the reference region of the current block is determined to be the first pixel line. When the current block refers to non-adjacent pixel lines, the MPM candidates of the first candidate group may be restricted so that they are not used. Or, conversely, when the intra prediction mode of the current block is derived from the first candidate group according to the second flag, the current block may be restricted to refer only to the first pixel line.

In addition, the second flag may be signaled only when the current block does not perform intra prediction in units of subblocks (condition 2). Conversely, when the current block performs intra prediction in units of subblocks, the flag may not be signaled and may be set equal to the second value in the decoding apparatus.

When any one of the above-described conditions 1 or 2 is satisfied, the second flag may be signaled, or when both conditions 1 and 2 are satisfied, the second flag may be signaled.

The first candidate group may be composed of a predefined default mode. The default mode may be at least one of a directional mode or a non-directional mode. For example, the directional mode may include at least one of a vertical mode, a horizontal mode, or a diagonal mode. The non-directional mode may include at least one of a planar mode and a DC mode.

The first candidate group may consist of only r non-directional modes or directional modes. r may be an integer of 1, 2, 3, 4, 5 or more. r may be a fixed value pre-committed to the encoding/decoding apparatus, or may be variably determined based on a predetermined encoding parameter.

The second candidate group may include a plurality of MPM candidates. However, the second candidate group may be limited not to include the default mode belonging to the first candidate group. The number of MPM candidates may be 2, 3, 4, 5, 6 or more. The number of MPM candidates may be a fixed value pre-committed to an encoding/decoding apparatus or may be variably determined based on an encoding parameter. The MPM candidate may be derived based on an intra prediction mode of a neighboring block adjacent to the current block. The neighboring block may be a block adjacent to at least one of the left, top, top-left, bottom-left, or top-right of the current block.

Specifically, the MPM candidate may be determined in consideration of whether the intra prediction mode of the left block (candIntraPredModeA) and the intra prediction mode of the top block (candIntraPredModeB) are the same, and whether candIntraPredModeA and candIntraPredModeB are non-directional modes.

[CASE 1] For example, when candIntraPredModeA and candIntraPredModeB are the same, and candIntraPredModeA is not a non-directional mode, the MPM candidate of the current block may include at least one of candIntraPredModeA, (candIntraPredModeA−n), (candIntraPredModeA+n), or a non-directional mode. Here, n may be an integer of 1, 2, or more. The non-directional mode may include at least one of a planar mode or a DC mode. As an example, the MPM candidate of the current block may be determined as shown in Table 1 below. The index of Table 1 specifies the position or priority of the MPM candidate, but is not limited thereto.

TABLE 1

| index | MPM candidate |
|---|---|
| 0 | candIntraPredMode A |
| 1 | 2 + ((candIntraPredModeA + 61) % 64) |

TABLE 1-continued

| index | MPM candidate |
|---|---|
| 2 | 2 + ((candIntraPredModeA − 1) % 64) |
| 3 | 2 + ((candIntraPredModeA + 60) % 64) |
| 4 | 2 + ((candIntraPredModeA % 64) |

[CASE 2] Or, when candIntraPredModeA and candIntraPredModeB are not the same, and both candIntraPredModeA and candIntraPredModeB are not a non-directional mode, the MPM candidates of the current block may include at least one of candIntraPredModeA, candIntraPredModeB, (maxAB−n), (maxAB+n), (minAB−n), (minAB+n), or a non-directional mode. Here, maxAB and minAB mean a maximum value and a minimum value of candIntraPredModeA and candIntraPredModeB, respectively, and n may be an integer of 1, 2, or more. The non-directional mode may include at least one of a planar mode or a DC mode. As an example, based on the difference value D between candIntraPredModeA and candIntraPredModeB, the candidate mode of the second candidate group may be determined as shown in Table 2 below. The index of Table 2 specifies the position or priority of the MPM candidate, but is not limited thereto.

TABLE 2

| Index | candidate mode (D = 1) | candidate mode (D = 2) | candidate mode (D >= 62) | candidate mode (Otherwise) |
|---|---|---|---|---|
| 0 | candIntraPredModeA | candIntraPredModeA | candIntraPredModeA | candIntraPredModeA |
| 1 | candIntraPredModeB | candIntraPredModeB | candIntraPredModeB | candIntraPredModeB |
| 2 | 2 + ((minAB + 61) % 64) | 2 + ((minAB − 1) % 64) | 2 + ((minAB − 1) % 64) | 2 + ((minAB + 61) % 64) |
| 3 | 2 + ((maxAB − 1) % 64) | 2 + ((minAB + 61) % 64) | 2 + ((maxAB + 61) % 64) | 2 + ((minAB − 1) % 64) |
| 4 | 2 + ((minAB + 60) % 64) | 2 + ((maxAB − 1) % 64) | 2 + (minAB % 64) | 2 + ((maxAB + 61) % 64) |

In Table 2 above, one of the MPM candidates is derived based on minAB, and another is derived based on maxAB. However, the present invention is not limited thereto, and the MPM candidate may be derived based on maxAB regardless of minAB, and conversely, may be derived based on minAB regardless of maxAB.

[CASE 3] When candIntraPredModeA and candIntraPredModeB are not the same, and only one of candIntraPredModeA and candIntraPredModeB is a non-directional mode, the MPM candidate of the current block may include at least one of maxAB, (maxAB−n), (maxAB+n), or a non-directional mode. Here, maxAB denotes the maximum value of candIntraPredModeA and candIntraPredModeB, and n may be an integer of 1, 2, or more. The non-directional mode may include at least one of a planar mode or a DC mode. As an example, the MPM candidate of the current block may be determined as shown in Table 3 below. The index of Table 3 specifies the position or priority of the MPM candidate, but is not limited thereto.

TABLE 3

| Index | MPM candidate |
|---|---|
| 0 | maxAB |
| 1 | 2 + ((maxAB + 61) % 64) |
| 2 | 2 + ((maxAB − 1) % 64) |
| 3 | 2 + ((maxAB + 60) % 64) |
| 4 | 2 + (maxAB % 64) |

[CASE 4] When candIntraPredModeA and candIntraPredModeB are not the same, and both candIntraPred- ModeA and candIntraPredModeB are non-directional modes, the MPM candidates of the current block may include a non-directional mode, a vertical mode, a horizontal mode, (vertical mode−m), (vertical mode+m)), (horizontal mode−m), or (horizontal mode+m). Here, m may be an integer of 1, 2, 3, 4 or more. The non-directional mode may include at least one of a planar mode or a DC mode. As an example, the MPM candidate of the current block may be determined as shown in Table 4 below. The index of Table 4 specifies the position or priority of the MPM candidate, but is not limited thereto. For example, index 1 may be assigned to the horizontal mode, or the largest index may be assigned to it. Further, the MPM candidate may include at least one of a diagonal mode (e.g., mode 2, mode 34, mode 66), (diagonal mode−m), or (diagonal mode+m).

TABLE 4

| Index | MPM candidate |
| --- | --- |
| 0 | INTRA_DC |
| 1 | Vertical mode |
| 2 | Horizontal mode |
| 3 | (Vertical mode − 4) |
| 4 | (Vertical mode + 4) |

The intra prediction mode (IntraPredMode) decoded through the above-described process may be changed/corrected based on a predetermined offset, which will be described in detail with reference to FIG. 7.

2. In the Case of Chroma Blocks

A pre-defined intra prediction modes for a chroma block may be divided into a first group and a second group. Here, the first group may be configured with inter-components reference-based prediction modes, and the second group may be configured with all or some of the above-described pre-defined intra prediction modes.

The intra prediction mode of the chroma block may be derived by selectively using either the first group or the second group. The selection may be performed based on a predetermined third flag. The third flag may indicate whether the intra prediction mode of the chroma block is derived based on the first group or the second group.

For example, when the third flag is a first value, the intra prediction mode of the chroma block may be determined as one of one or more inter-components reference-based prediction modes belonging to the first group. This will be described in detail in FIG. 8.

On the other hand, when the third flag is a second value, the intra prediction mode of the chroma block may be determined as one of a plurality of intra prediction modes belonging to the second group. As an example, the second group may be defined as shown in Table 5, and the intra prediction mode of the chroma block may be derived based on information (intra_chroma_pred_mode) signaled by the encoding apparatus and the intra prediction mode (IntraPredModeY) of the luma block.

TABLE 5

| intra_chroma_pred_mode[xCb][yCb] | IntraPredModeY[xCb + cbWidth/2][yCb + cbHeight/2] | | | | |
| --- | --- | --- | --- | --- | --- |
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 5-continued

According to Table 5, the intra prediction mode of the chroma block may be determined based on the signaled information and the intra prediction mode of the luma block. The mode numbers listed in Table 5 correspond to the mode numbers in FIG. 4. For example, when a value of the signaled information intra_chroma_pred_mode is 0, the intra prediction mode of the chroma block may be determined as the diagonal mode 66 or the planar mode (0) according to the intra prediction mode of the luma block. Alternatively, when the value of the signaled information intra_chroma_pred_mode is 4, the intra prediction mode of the chroma block may be set to be the same as the intra prediction mode of the luma block. Meanwhile, the intra prediction mode (IntraPredModeY) of the luma block may be an intra prediction mode of a subblock including a specific position in the luma block. Here, the specific position in the luma block may correspond to a center position in the chroma block.

However, there may be a case where a subblock in the luma block corresponding to the center position in the chroma block is not available. Here, "not available" may be a case in which the corresponding subblock is not encoded in an intra mode. For example, when a subblock does not have an intra prediction mode, such as when a corresponding subblock is encoded in an inter mode or a current picture reference mode, it may be determined that the corresponding subblock is not available. In this case, the intra prediction mode (IntraPredModeY) of the luma block may be set equal to a mode pre-committed to the encoding/decoding apparatus. Here, the pre-committed mode may be any one of a planar mode, a DC mode, a vertical mode, or a horizontal mode.

Referring to FIG. 5, the current block may be decoded based on the reference region for intra prediction and the intra prediction mode (S520).

The decoding of the current block may be performed in units of subblocks of the current block. To this end, the current block may be divided into a plurality of subblocks. Here, the current block may correspond to a leaf node. The leaf node may mean a coding block that is no longer divided into smaller coding blocks. That is, the leaf node may mean a block that is no longer divided through the tree-based block division described above.

The division may be performed based on the size of the current block (Embodiment 1).

For example, when the size of the current block is less than a predetermined threshold size, the current block may be divided into two vertically or horizontally. Conversely, when the size of the current block is greater than or equal to the threshold size, the current block may be divided into four vertically or horizontally. The threshold size may be signaled by the encoding apparatus or may be a fixed value pre-defined in the decoding apparatus. For example, the threshold size is expressed as N×M, and N and M may be 4, 8, 16 or more. The N and M may be the same or may be set differently from each other.

Alternatively, if the size of the current block is less than the predetermined threshold size, the current block is not divided (non-split). Otherwise, the current block may be divided into two or four.

The division may be performed based on the shape of the current block (Embodiment 2).

For example, if the shape of the current block is a square, the current block is divided into four, and otherwise, the current block may be divided into two. Conversely, if the shape of the current block is a square, the current block is divided into two, and otherwise, the current block may be divided into four.

Alternatively, if the shape of the current block is a square, the current block is divided into two or four, and otherwise, the current block may not be divided. Conversely, when the shape of the current block is a square, the current block is not divided, and otherwise, the current block may be divided into two or four.

The division may be performed by selectively applying any one of the above-described embodiment 1 or 2, or the division may be performed based on a combination of the embodiments 1 and 2.

The two-division means dividing into two in either vertical or horizontal direction, and the four-division may include dividing into four in either vertical or horizontal direction or dividing into four in vertical and horizontal directions.

In the above embodiment, two- or four-division is described, but the present invention is not limited thereto, and the current block may be divided into three in a vertical or horizontal direction. In this case, the ratio of the width or height may be (1:1:2), (1:2:1), or (2:1:1).

Information on whether to divide into subblock units, whether to divide into four, a division direction, and a division number may be signaled from the encoding apparatus or variably determined by the decoding apparatus based on a predetermined encoding parameter. Here, the encoding parameter may mean a block size/shape, a division type (for-division, two-division, three-division), an intra prediction mode, a range/position of a neighboring pixel for intra prediction, a component type (e.g., luma and chroma), a maximum/minimum size of a transform block, a transform type (e.g., transform skip, DCT2, DST7, DCT8), and the like.

Subblocks of the current block may be sequentially predicted/reconstructed according to a predetermined priority. In this case, a first subblock of the current block may be predicted/reconstructed, and a second subblock may be predicted/reconstructed with reference to the pre-decoded first subblock. Regarding the priority, it is predicted/reconstructed in the order of top→bottom, but each subblock at the top and bottom may be predicted/reconstructed in the order of left→right. Alternatively, it is predicted/reconstructed in the order of top→bottom, but each sub-block at the top and bottom may be predicted/reconstructed in the order of right→left. Alternatively, it is predicted/reconstructed in the order of bottom→top, but each subblock at the bottom and top may be predicted/reconstructed in the order of left→right. Alternatively, it is predicted/reconstructed in the order of bottom→top, but each subblock at the bottom and top may be predicted/restored in the order of right→top. Alternatively, it is predicted/reconstructed in the order of left→right, but each subblock at the left and right may be predicted/reconstructed in the order of top→bottom. Alternatively, it is predicted/reconstructed in the order of left→right, but each subblock at the left and right may be predicted/reconstructed in the order of bottom→top. Alternatively, it is predicted/reconstructed in the order of right-→left, but each sub-block at the right and left may be predicted/reconstructed in the order of top→bottom. Alternatively, it is predicted/reconstructed in the order of right-→left, but each sub-block at the right and left may be predicted/reconstructed in the order of bottom→top.

The encoding/decoding apparatus may define any one of the above-described orders and use the same. Alternatively, the encoding/decoding apparatus may define at least two or more of the above-described orders and selectively use any one of them. To this end, an index or flag specifying any one of a pre-defined orders may be encoded and signaled.

Figure 6:
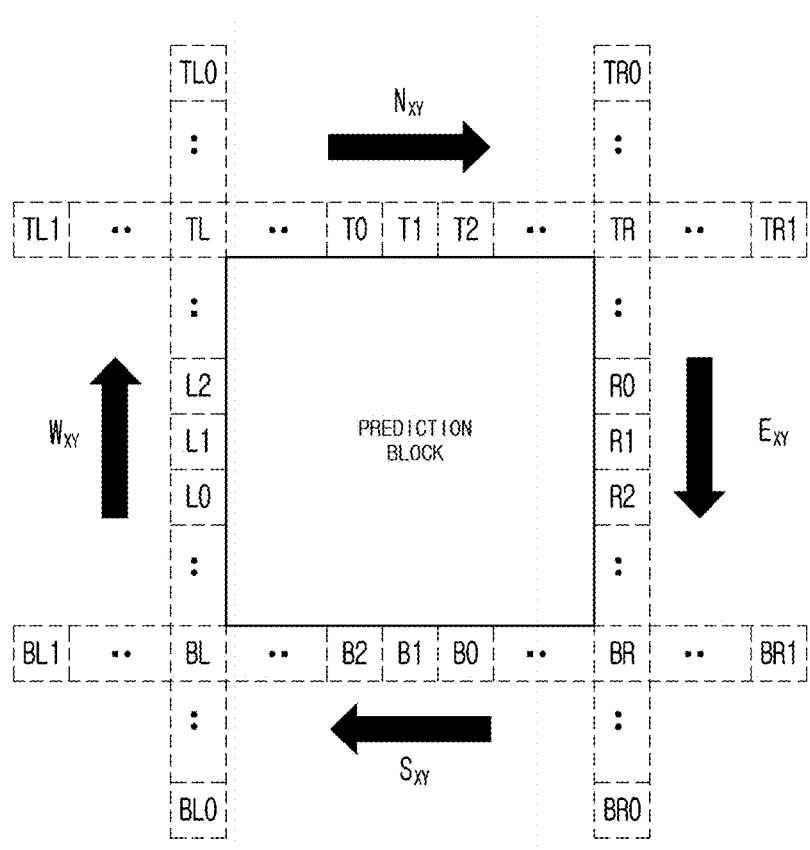
FIG. 6 illustrates a method of replacing an unavailable pixel in a reference region as an embodiment to which the present invention is applied.

FIG. 6 illustrates a method of replacing an unavailable pixel in a reference region as an embodiment to which the present invention is applied.

As described above, the reference region may be determined as one of the first to fourth pixel lines. However, in the present embodiment, for convenience of description, it is assumed that the reference region is the first pixel line. The present embodiment may be applied in the same manner or similarly to the second to fourth pixel lines.

When all the pixels in the reference region are not available, the corresponding pixel may be replaced with one of a range of pixel values expressed by a bit depth or a range of actual pixel values of an image. For example, the maximum value, minimum value, median value, average value, etc. of a range of the pixel values may correspond to a value to be replaced. When the bit depth is 8, all pixels of the reference region may be filled with 128 when replacing with the median value of the bit depth.

However, if not, that is, not all pixels of the reference region are not available, but at least one of the pixels of the reference region is not available, the replacement process may be performed for at least one of the top reference region, the left reference region, the right reference region, or bottom reference region of the current block. For the convenience of explanation, the description will focus on the left, top, and right reference regions of the current block.

(STEP1) It is determined whether the top-left pixel TL adjacent to the current block (prediction block) is not available. If the top-left pixel TL is not available, the pixel may be replaced with a median value of the bit depth.

(STEP2) It is possible to sequentially search whether an unavailable pixel exists in the top reference region. Here, the top reference region may include a pixel line adjacent to at least one of the top or the top-right of the current block. The length of the top reference region may be equal to the width of the current block (nW), (2*nW), or the sum of the width and the height (nW+nH).

Here, the search direction may be performed from left to right. In this case, when it is determined that the pixel p[x][−1] is not available, the pixel p[x][−1] may be replaced with the neighboring pixel p[x−1][−1]. Alternatively, the search direction may be performed from right to left. In this case, when it is determined that the pixel p[x][−1] is not available, the pixel p[x][−1] may be replaced with the neighboring pixel p[x+1][−1].

(STEP3) It is possible to sequentially search whether an unavailable pixel exists in the left reference region. Here, the left reference region may include a pixel line adjacent to at least one of the left or the bottom-left of the current block. The length of the left reference region may be equal to the height of the current block (nH), (2*nH) or the sum of the width and the height (nW+nH).

Here, the search direction may be performed from top to bottom. In this case, when it is determined that the pixel p[−1][y] is not available, the pixel p[−1][y] may be replaced with the neighboring pixel p[−1][y−1]. Alternatively, the search direction may be performed from bottom to top. In this case, when it is determined that the pixel p[−1][y] is not available, the pixel p[−1][y] may be replaced with the neighboring pixel p[−1][y+1].

(STEP4) It is possible to sequentially search whether an unavailable pixel exists in the right reference region. Here, the right reference region may include a pixel line adjacent to the right of the current block. The length of the right reference region may be the same as the height of the current block (nH).

Here, the search direction may be performed from top to bottom. In this case, when it is determined that the pixel p[nW][y] is not available, the pixel p[nW][y] may be replaced with the neighboring pixel p[nW][y−1]. Alternatively, the search direction may be performed from bottom to top. In this case, when it is determined that the pixel p[W][y] is not available, the pixel p[nW][y] may be replaced with the neighboring pixel p[nW][y+1].

Alternatively, a separate search process may be omitted for the right reference region. Instead, an unavailable pixel in the right reference region may be filled with the median value of the bit depth. Alternatively, an unavailable pixel in the right reference region may be replaced with one of the top-right pixel TR or the bottom-right pixel BR adjacent to the current block, or may be replaced with a representative value thereof. Here, the representative value may be expressed as an average value, a maximum value, a minimum value, a mode value, a median value, and the like. Alternatively, the unavailable pixel in the right reference region may be derived by applying a predetermined weight to each of the top-right pixel TR and the bottom-right pixel BR. In this case, the weight may be determined in consideration of a first distance between an unavailable pixel in the right reference region and a top-right pixel TR and a second distance between an unavailable pixel in the right reference region and a bottom-right pixel BR. The bottom-right pixel BR may be filled with one of a top-left pixel TL, a top-right pixel TR, or a bottom-left pixel BL adjacent to the current block, or may be replaced with a representative value of at least two of a top-left pixel TL, a top-right pixel TR, or a bottom-left pixel BL. Here, the representative value is as described above. Alternatively, the bottom-right pixel BR may be derived by applying a predetermined weight to at least two of the top-left pixel TL, the top-right pixel TR, or the bottom-left pixel BL, respectively. Here, the weight may be determined in consideration of a distance from the bottom-right pixel BR.

Meanwhile, the above-described replacement process is not limited to being performed in the priority of top→left→right. For example, the replacement process may be performed in the priority of left→top→right. Alternatively, the replacement process may be performed in parallel for the top and left reference regions, and then may be performed for the right reference region. In addition, the STEP1 process may be omitted when the replacement process is performed in the priority of left→top→right.

Figure 7:
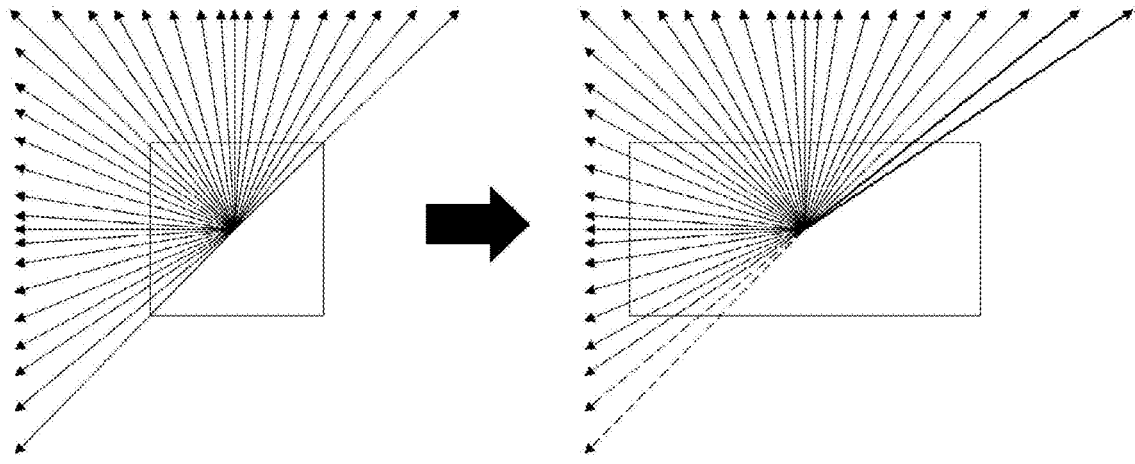
FIG. 7 illustrates a method of changing/correcting an intra prediction mode as an embodiment to which the present invention is applied.

FIG. 7 illustrates a method of changing/correcting an intra prediction mode as an embodiment to which the present invention is applied.

The decoded intra prediction mode (IntraPredMode) may be changed based on a predetermined offset. The application of the offset may be selectively performed based on at least one of a block property, that is, a size, a shape, division information, a division depth, a value of an intra prediction mode, or a component type. Here, the block may mean the current block and/or a neighboring block of the current block.

The division information may include at least one of first information indicating whether the current block is divided into a plurality of subblocks, second information indicating a division direction (e.g., horizontal or vertical), or third information on the number of divided subblocks. The division information may be encoded and signaled by an encoding apparatus. Alternatively, some of the division information may be variably determined in the decoding apparatus based on the above-described block property, or may be set to a fixed value pre-defined in the encoding/decoding apparatus.

For example, if the first information is a first value, the current block is divided into a plurality of subblocks, otherwise, the current block may not be divided into a plurality of subblocks (NO_SPLIT). When the current block is divided into a plurality of subblocks, the current block may be horizontally divided (HOR_SPLIT) or vertically divided (VER_SPLIT) based on the second information. In this case, the current block may be divided into k subblocks. Here, k may be an integer of 2, 3, 4 or more. Alternatively, k may be limited to a power of 2, such as 1, 2, 4, etc. Alternatively, in the case of a block in which at least one of a width or a height of the current block is 4 (for example, 4×8, 8×4), k is set to 2, otherwise, k is set to 4, 8, or 16. When the current block is non-divided (NO_SPLIT), k may be set to 1.

The current block may be divided into subblocks having the same width and height, or may be divided into subblocks having different widths and heights. The current block may be divided into N×M block units (e.g., 2×2, 2×4, 4×4, 8×4, 8×8, etc.) pre-committed to the encoding/decoding apparatus, regardless of the property of the above-described block.

The offset may be applied only when the size of the current block is less than or equal to a predetermined threshold value T1. Here, the threshold value T1 may mean a maximum block size to which an offset is applied. Alternatively, it may be applied only when the size of the current block is greater than or equal to a predetermined threshold value T2. In this case, the threshold value T2 may mean the minimum block size to which the offset is applied. The threshold value may be signaled through a bitstream. Alternatively, it may be variably determined by the decoding apparatus based on at least one of the above-described block properties or may be a fixed value pre-committed to the encoding/decoding apparatus.

Alternatively, the offset may be applied only when the shape of the current block is non-square. For example, when the following conditions are satisfied, a predetermined offset (e.g., 65) may be added to the IntraPredMode of the current block.

nW is greater than nH

IntraPredMode is greater than or equal to 2

IntraPredMode is less than (whRatio>1)?(8+2*whRatio):8

Here, nW and nH denote the width and height of the current block, respectively, and whRatio may be set to Abs (Log 2 (nW/nH)).

Alternatively, when the following conditions are satisfied, a predetermined offset (e.g., 67) may be subtracted from the IntraPredMode of the current block.

nH is greater than nW

IntraPredMode is less than or equal to 66

IntraPredMode is greater than (whRatio>1)? (60−2*whRatio):60

As described above, the final intra prediction mode may be determined by adding/subtracting the offset to the intra prediction mode (IntraPredMode) of the current block in consideration of the property of the current block. However, the present invention is not limited thereto, and the application of the offset may be performed in the same/similar manner in consideration of the properties (e.g., size, shape) of the subblock instead of the current block.

Figure 8:
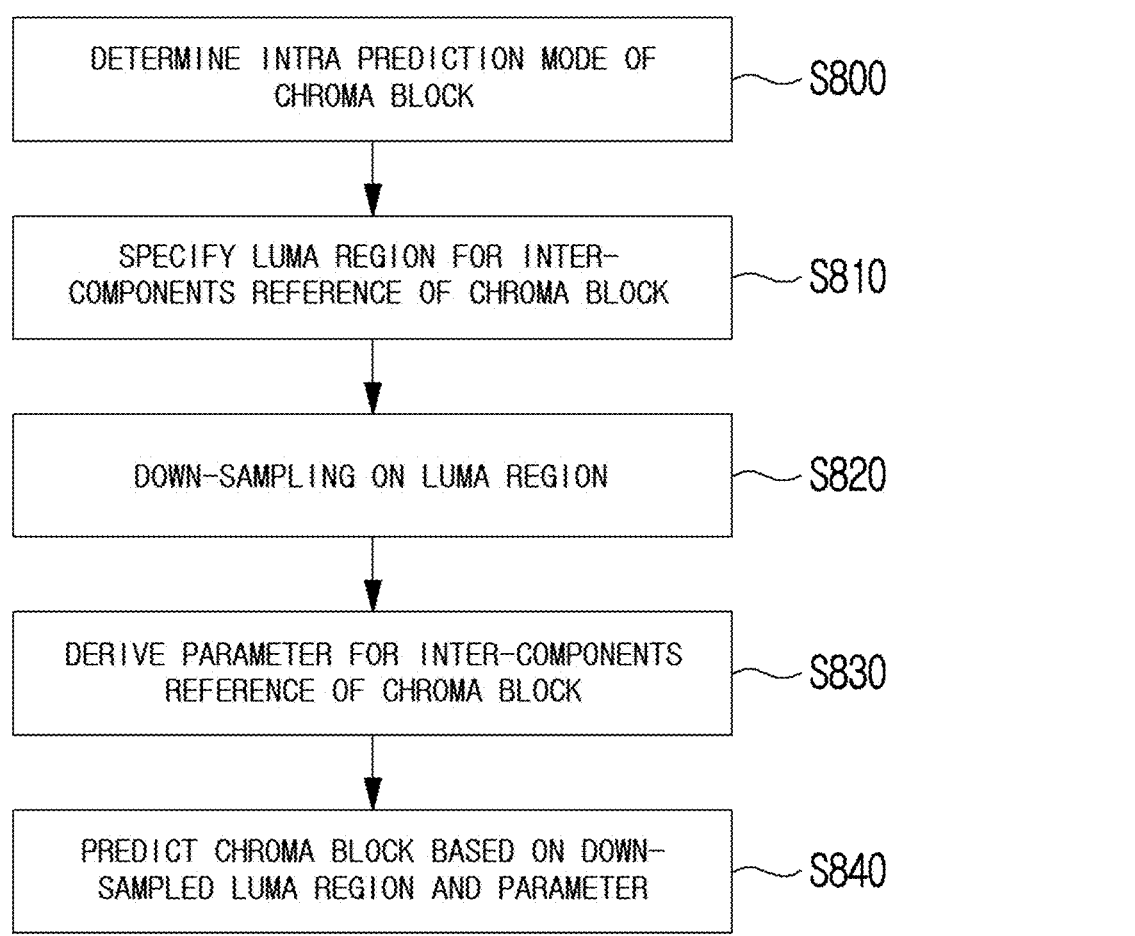
FIG. 8 illustrates an inter-components reference-based prediction method as an embodiment to which the present invention is applied.

FIG. 8 illustrates an inter-components reference-based prediction method in an embodiment to which the present disclosure is applied.

The current block may be divided into a luma block and a chroma block according to a component type. The chroma block may be predicted using the pixel of the reconstructed luma block. This is referred to as an inter-components reference. In this embodiment, it is assumed that the chroma block has a size of (nTbW×nTbH), and the luma block corresponding to the chroma block has a size of (2*nTbW× 2*nTbH).

Referring to FIG. 8, an intra prediction mode of a chroma block may be determined (S800).

As described in FIG. 5, the intra prediction mode of the chroma block may be determined as one of one or more inter-components reference-based prediction modes belonging to the first group according to the third flag. The first group may be composed of only inter-components reference-based prediction modes. The encoding/decoding apparatus may define at least one of INTRA_LT_CCLM, INTRA_L_CCLM, or INTRA_T_CCLM as an inter-components reference-based prediction mode. INTRA_LT_C-CLM is a mode that refers to both the left and top regions adjacent to the luma/chroma blocks, INTRA_L_CCLM is a mode that refers to the left region adjacent to the luma/chroma blocks, and INTRA_T_CCLM is a mode that refers to the top region adjacent to the luma/chroma blocks.

A predetermined index may be used to select any one of the inter-components reference-based prediction modes. The index may be information specifying any one of INTRA_LT_CCLM, INTRA_L_CCLM, or INTRA_T_C-CLM. The index may be signaled only when the third flag is a first value. The inter-components reference-based prediction modes belonging to the first group and the indexes assigned to each prediction mode are shown in Table 6 below.

TABLE 6

| Idx | inter-components reference-based prediction mode |
|-----|--------------------------------------------------|
| 0   | INTRA_LT_CCLM                                    |
| 1   | INTRA_L_CCLM                                     |
| 2   | INTRA_T_CCLM                                     |

Table 6 is only an example of an index assigned to each prediction mode, but is not limited thereto. That is, as shown in Table 6, indexes may be assigned in the priority order of INTRA_LT_CCLM, INTRA_L_CCLM, INTRA_T_C-CLM, or indexes may be assigned in the priority order of INTRA_LT_CCLM, INTRA_T_CCLM, INTRA_L_C-CLM. Alternatively, INTRA_LT_CCLM may have a lower priority order than INTRA_T_CCLM or INTRA_L_CCLM.

The third flag may be selectively signaled based on information indicating whether the inter-components reference is allowed. For example, if a value of the information is 1, the third flag may be signaled, otherwise, the third flag may not be signaled. Here, the information may be determined as 0 or 1 based on a predetermined condition described later.

(Condition 1) When a fourth flag indicating whether inter-components reference-based prediction is allowed is 0, the information may be set to 0. The fourth flag may be signaled in at least one of VPS, SPS, PPS, PH, and slice header.

(Condition 2) When at least one of the following sub-conditions is satisfied, the information may be set to 1.
   qtbtt_dual_tree_intra_flag is equal to 0
   a slice type is not I-slice
   a size of a coding tree block is less than 64×64

In condition 2, qtbtt_dual_tree_intra_flag may indicate whether a coding tree block is implicitly divided into a 64×64 coding block and a 64×64 coding block is divided based on a dual tree. The dual tree may refer to a method in which a luma component and a chroma component are divided with an independent division structure. The size of the coding tree block (Ctb Log 2Size) may be a size (e.g., 64×64, 128×128, 256×256) pre-defined in an encoding/decoding apparatus, or may be encoded and signaled by an encoding apparatus.

(Condition 3) When at least one of the following sub-conditions is satisfied, the information may be set to 1.
   a width and a height of a first upper block are 64
   a depth of a first upper block is the same as (Ctb Log 2Size-6), the first upper block is divided based on Horizontal BT, and a second upper block is 64×32
   a depth of the first upper block is greater than (Ctb Log 2Size-6)
   a depth of the first upper block is the same as (Ctb Log 2Size-6), the first upper block is divided based on Horizontal BT, and a second upper block is divided based on Vertical BT In condition 3, the first upper block may be a block including the current chroma block as a lower block. For example, when the depth of the current chroma block is k, the depth of the first upper block is (k-n), and n may be 1, 2, 3, 4 or more. The depth of the first upper block may mean only a depth according to division based on a quad tree, or may mean a depth according to division of at least one of a quad tree, a binary tree, or a ternary tree. The second upper block is a lower block belonging to the first upper block, and may have a depth less than a current chroma block and a depth greater than the first upper block. For example, when the depth of the current chroma block is k, the depth of the second upper block is (k−m), and m may be a natural number less than n.

When neither of the above-described conditions 1 to 3 is satisfied, the information may be set to 0.

However, even when at least one of conditions 1 to 3 is satisfied, when at least one of the following sub-conditions is satisfied, the information may be reset to 0.
   the first upper block is 64×64 and the above-described subblock-based prediction is performed
   at least one of the width or height of the first upper block is less than 64 and the depth of the first upper block is equal to (Ctb Log 2Size-6)

Referring to FIG. 8, a luma region for inter-components reference of the chroma block may be specified (S810).

The luma region may include at least one of a luma block or a neighboring region adjacent to the luma block. Here, the luma block may be defined as a region including pixels pY[x][y] (x=0 . . . nTbW*2-1, y=0 . . . nTbH*2-1). The pixels may mean reconstructed values before the in-loop filter is applied.

The neighboring region may include at least one of a left neighboring region, a top neighboring region, or a top-left neighboring region. The left neighboring region may be set as a region including pixels pY[x][y] (x=−1 . . . 3, y=0 . . . 2*numSamp−1). The setting may be performed only when the value of numSampL is greater than 0. The top neighboring region may be set as a region including pixels pY[x][y] (x=0 . . . 2*numSampT−1, y=−1 . . . 3). The setting may be performed only when the value of numSampT is greater than 0. The top-left neighboring region may be set as a region including pixels pY[x][y] (x=−1, y=−1, −2). The setting may be performed only when the top-left region of the luma block is available.

The above-described numSampL and numSampT may be determined based on the intra prediction mode of the current block. Herein, the current block may denote the chroma block.

For example, when the intra prediction mode of the current block is INTRA_LT_CCLM, it may be derived based on Equation 9. Here, INTRA_LT_CCLM may mean a mode in which inter-components reference is performed based on left and top neighboring regions to the current block.

numSampT=availT?nTbW:0 numSampL=availL?nTbH:0　　　　　　　[Equation 1]

According to Equation 1, numSampT is derived as nTbW when the top neighboring region to the current block is available. Otherwise, numSampT may be derived as 0. Similarly, numSampL is derived as nTbH when the left neighboring region to the current block is available. Otherwise, numSampL may be derived as 0.

To the contrary, when the intra prediction mode of the current block is not INTRA_LT_CCLM, it may be derived based on Equation 2 below.

numSampT=(availT &&
  predModeIntra==INTRA_T_CCLM)?(nTbW+
  numTopRight):0 numSampL=(availL &&
  predModeIntra=INTRA_L_CCLM)?(nTbH+
  numLeftBelow):0　　　　　　　[Equation 1]

In Equation 2, INTRA_T_CCLM may refer to a mode in which inter-components reference is performed based on a top neighboring region to the current block. INTRA_L_C-CLM may mean a mode in which inter-components reference is performed based on a left neighboring region to the current block. numTopRight may mean the number of all or some pixels belonging to a top-right neighboring region to the chroma block. Some pixels may refer to available pixels among pixels belonging to the lowest pixel row of the corresponding region. In an availability determination, whether the pixels are available may determined sequentially in a left to a right direction. This process may be performed until an unavailable pixel is found. numLeftBelow may mean the number of all or some pixels belonging to a bottom-left neighboring region to the chroma block. Some pixels may refer to available pixels among pixels belonging to the rightmost pixel line (column) of the corresponding region. In the availability determination, whether pixels are available may be determined sequentially in a top to a bottom direction. This process may be performed until an unavailable pixel is found.

Referring to FIG. 8, down-sampling may be performed on the luma region specified in S810 (S820).

The down-sampling may include at least one of 1. Down-sampling of the luma block, 2. Down-sampling of the left neighboring region to the luma block, or 3. Down-sampling of the top neighboring region to the luma block. This will be described in detail below.

1. Down-Sampling of Luma Block

Embodiment 1

The pixel pDsY[x][y] (x=0 . . . nTbW−1, y=0 . . . nTbH−1) of the down-sampled luma block may be derived based on a corresponding pixel pY[2*x][2*y] of the luma block and the neighboring pixel. The neighboring pixel may mean at least one of a left neighboring pixel, a right neighboring pixel, a top neighboring pixel, or a bottom neighboring pixel to the corresponding pixel. For example, the pixel pDsY[x][y] may be derived based on Equation 3 below.

$$pDsY[x][y] = (pY[2*x][2*y-1] + \qquad\qquad \text{[Equation 3]}$$
$$pY[2*x-1][2*y] + 4*pY[2*x][2*y] +$$
$$pY[2*x+1][2*y] + pY[2*x][2*y+1] + 4) >> 3$$

However, there may be a case where the left/top neighboring region to the current block are not available. When the left neighboring region to the current block is not available, the pixel pDsY[0][y] (y=1 . . . nTbH−1) of the down-sampled luma block may be derived based on the corresponding pixel pY[0][2*y] of the luma block and the neighboring pixel of the corresponding pixel. The neighboring pixel may mean at least one of the top neighboring pixel or the bottom neighboring pixel to the corresponding pixel. For example, pixel pDsY[0][y] (y=1 . . . nTbH−1) may be derived based on Equation 4 below.

$$pDsY[0][y] = (pY[0][2*y-1] + \qquad\qquad \text{[Equation 4]}$$
$$2*pY[0][2*y] + pY[0][2*y+1] + 2) >> 2$$

When the top neighboring region to the current block is not available, the pixel pDsY[x][0] (x=1 . . . nTbW−1) of the down-sampled luma block may be derived based on the corresponding pixel pY[2*x][0] of the luma block and the neighboring pixel of the corresponding pixel. The neighboring pixel may mean at least one of the left neighboring pixel or the right neighboring pixel to the corresponding pixel. For example, the pixel pDsY[x][0] (x=1 . . . nTbW−1) may be derived based on Equation 5 below.

$$pDsY[x][0] = \qquad\qquad \text{[Equation 5]}$$
$$(pY[2*x-1][0] + 2*pY[2*x][0] + pY[2*x+1][0] + 2) >> 2$$

The pixel pDsY[0][0] of the down-sampled luma block may be derived based on the corresponding pixel pY[0][0] of the luma block and/or a neighboring pixel of the corresponding pixel. The position of the neighboring pixel may vary depending on whether left/top neighboring regions to the current block are available.

For example, when the left neighboring region is available but the top neighboring region is not available, pDsY[0][0] may be derived based on Equation 6 below.

$$pDsY[0][0] = (pY[-1][0] + 2*pY[0][0] + pY[1][0] + 2) >> 2 \quad \text{[Equation 6]}$$

To the contrary, when the left neighboring region is not available, but the top neighboring region is available, pDsY [0][0] may be derived based on Equation 7 below.

$$pDsY[0][0] = (pY[0][-1] + 2 * pY[0][0] + pY[0][1] + 2) >> 2 \quad \text{[Equation 7]}$$

In another example, when both the left and top neighboring regions are not available, pDsY[0][0] may be set as the corresponding pixel pY[0][0] of the luma block.

Embodiment 2

The pixel pDsY[x][y] (x=0 . . . nTbW−1, y=0 . . . nTbH−1) of the down-sampled luma block may be derived based on the corresponding pixel pY[2*x][2*y] of the luma block and the neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pDsY[x][y] may be derived based on Equation 8 below.

$$pDsY[x][y] = (pY[2*x−1[2*y] + pY[2*x−1][2*y+1] + \quad \text{[Equation 8]}$$
$$2 * pY[2*x][2*y] + 2 * pY[2*x][2*y+1] +$$
$$pY[2*x+1][2*y] + pY[2*x+1][2*y+1] + 4) >> 3$$

However, when the left neighboring region to the current block is not available, the pixel pDsY[0][y] (y=0 . . . nTbH−1) of the down-sampled luma block may be derived based on the corresponding pixel pY[0][2*y] of the luma block and a bottom neighboring pixel thereto. For example, the pixel pDsY[0][y] (y=0 . . . nTbH−1) may be derived based on Equation 9 below.

$$pDsY[0][y] = (pY[0][2*y] + pY[0][2*y+1] + 1) >> 1 \quad \text{[Equation 9]}$$

Down-sampling of the luma block may be performed based on one of Embodiments 1 and 2 as described above. Here, one of Embodiments 1 and 2 may be selected based on a pre-determined flag. The flag may indicate whether the down-sampled luma pixel has the same position as that of the original luma pixel. For example, when the flag is a first value, the down-sampled luma pixel has the same position as that of the original luma pixel. To the contrary, when the flag is a second value, the down-sampled luma pixel has the same position as that of the original luma pixel in the horizontal direction, but has a position shifted by half pel in the vertical direction. 2. Down-sampling of left neighboring region to luma block

Embodiment 1

The pixel pLeftDsY[y] (y=0 . . . numSampL−1) of the down-sampled left neighboring region may be derived based on the corresponding pixel pY[−2][2*y] of the left neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pLeftDsY[y] may be derived based on Equation 10 below.

$$pLeftDsY[y] = \quad \text{[Equation 10]}$$
$$(pY[−2][2*y−1] + pY[−3][2*y] + 4 * pY[−2][2*y] +$$
$$pY[−1][2*y] + pY[−2][2*y+1] + 4) >> 3$$

However, when the top-left neighboring region to the current block is not available, the pixel pLeftDsY[0] of the down-sampled left neighboring region may be derived based on the corresponding pixel pY[−2][0] of the left neighboring region and a neighboring pixel of the corresponding pixel. The neighboring pixel may mean at least one of the left neighboring pixel or a right neighboring pixel to the corresponding pixel. For example, the pixel pLeftDsY[0] may be derived based on Equation 11 below.

$$pLeftDsY[0] = \quad \text{[Equation 11]}$$
$$(pY[−3][0] + 2 * pY[−2][0] + pY[−1][0] + 2) >> 2$$

Embodiment 2

The pixel pLeftDsY[y] (y=0 . . . numSampL−1) of the down-sampled left neighboring region may be derived based on the corresponding pixel pY[−2][2*y] of the left neighboring region and a neighboring pixel around the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pLeftDsY[y] may be derived based on following Equation 12.

$$pLeftDsY[y] = (pY[−1][2*y] + pY[−1][2*y+1] + \quad \text{[Equation 12]}$$
$$2 * pY[−2][2*y] + 2 * pY[−2][2*y+1] +$$
$$pY[−3][2*y] + pY[−3][2*y+1] + 4) >> 3$$

Similarly, down-sampling of the left neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

Down-sampling of the left neighboring region may be performed only when the numSampL value is greater than 0. When the numSampL value is greater than 0, it may mean that the left neighboring region to the current block is available, and the intra prediction mode of the current block is INTRA_LT_CCLM or INTRA_L_CCLM.
3. Down-Sampling of Top Neighboring Region to Luma Block

Embodiment 1

The pixel pTopDsY[x] (x=0 . . . numSampT−1) of the down-sampled top neighboring region may be derived in consideration of whether the top neighboring region belongs to a CTU different from a CTU to which the luma block belongs.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pTopDsY[x] may be derived based on Equation 13 below.

$$pTopDsY[x] = \qquad \text{[Equation 13]}$$
$$(pY[2*x][-3] + pY[2*x-1][-2] + 4*pY[2*x][-2] +$$
$$pY[2*x+1][-2] + pY[2*x][-1] + 4) >> 3$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 14 below.

$$pTopDsY[x] = (pY[2*x-1][-1] + \qquad \text{[Equation 14]}$$
$$2*pY[2*x][-1] + pY[2*x+1][-1] + 2) >> 2$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 15 below.

$$pTopDsY[0] = \qquad \text{[Equation 15]}$$
$$(pY[0][-3] + 2*pY[0][-2] + pY[0][-1] + 2) >> 2$$

Alternatively, when the top-left neighboring region to the current block is unavailable and the top neighboring region belongs to a CTU different from the luma block, the pixel pTopDs Y[0] may be set as the pixel pY[0][−1] of the top neighboring region.

Embodiment 2

The pixel pTopDsY[x] (x=0 . . . numSampT−1) of the down-sampled top neighboring region may be derived in consideration of whether the top neighboring region belongs to a CTU different from the luma block.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pTopDsY[x] may be derived based on Equation 16 below.

$$pTopDsY[x] = (pY[2*x-1][-2] + \qquad \text{[Equation 16]}$$
$$pY[2*x-1][-1] + 2*pY[2*x][-2] + 2*pY[2*x][-1] +$$
$$pY[2*x+1][-2] + pY[2*x+1][-1] + 4) >> 3$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 17 below.

$$pTopDsY[x] = (pY[2*x-1][-1] + \qquad \text{[Equation 17]}$$
$$2*pY[2*x][-1] + pY[2*x+1][-1] + 2) >> 2$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 18 below.

$$pTopDsY[0] = (pY[0][-2] + pY[0][-1] + 1) >> 1 \qquad \text{[Equation 18]}$$

Alternatively, when the top-left neighboring region to the current block is unavailable and the top neighboring region belongs to a CTU different from the luma block, the pixel pTopDsY[0] may be set as pixel pY[0][−1] of the top neighboring region.

In the similar manner, down-sampling of the top neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

Meanwhile, down-sampling of the top neighboring region may be performed only when the numSampT value is greater than 0. When the numSampT value is greater than 0, it may mean that the top neighboring region to the current block is available, and the intra prediction mode of the current block is INTRA_LT_CCLM or INTRA_T_CCLM.

Down-sampling for at least one of the left or top neighboring regions of the luma block (hereinafter, luma reference region) may be performed using only the corresponding pixel pY[−2][2*y] at a specific position and the surrounding pixels. Here, the specific position may be determined based on a position of a selected pixel among a plurality of pixels belonging to at least one of the left or top neighboring regions of the chroma block (hereinafter, referred to as chroma reference region).

The selected pixel may be an odd-numbered pixel or an even-numbered pixel in the chroma reference region. Alternatively, the selected pixel may be a start pixel and one or more pixels positioned at predetermined intervals from the start pixel. Here, the start pixel may be a pixel positioned at the first, second, or third position in the chroma reference region. The interval may be 1, 2, 3, 4 or more sample intervals. For example, when the interval is one sample interval, the selected pixel may include an nth pixel, an (n+2) th pixel, and the like. The number of selected pixels may be 2, 4, 6, 8 or more.

The number of selected pixels, the starting pixel, and the interval may be variably determined based on at least one of a length of a chroma reference region (i.e., numSampL and/or numSampT) or an intra prediction mode of a chroma block. Alternatively, the number of selected pixels may be a fixed number (e.g., 4) pre-committed to the encoding/decoding apparatus regardless of the length of the chroma reference region and the intra prediction mode of the chroma block.

Referring to FIG. 8, a parameter for inter-components reference of the chroma block may be derived (S830).

The parameter may include at least one of a weight or an offset. The parameter may be determined in consideration of the intra prediction mode of the current block. The parameter may be derived using a selected pixel of the chroma reference region and a pixel obtained through down-sampling of the luma reference region.

Specifically, n pixels may be classified into two groups by performing size comparison between n pixels obtained through down-sampling of the luma reference region. For example, a first group may be a group of pixels having a relatively large value among n pixels, and a second group may be a group of pixels other than the pixels of the first group among n samples. That is, the second group may be a group of pixels having a relatively small value. Here, n may be 4, 8, 16 or more. An average value of pixels belonging to the first group may be set as a maximum value MaxL, and an average value of pixels belonging to the second group may be set as a minimum value MinL.

According to grouping of n pixels obtained through down-sampling of the luma reference region, selected pixels of the chroma reference region may be grouped. A first group for the chroma reference region is configured by using pixels of the chroma reference region corresponding to the pixels of the first group of the luma reference region. A second group for the chroma reference region may be configured by using pixels of the chroma reference region corresponding to the pixels of the second group of the luma reference region. Similarly, the average value of the pixels in the first group may be set as the maximum value MaxC, and the average value of the pixels in the second group may be set as the minimum value MinC.

Based on the calculated maximum values (MaxL, MaxC) and minimum values (MinL, MaxC), the weight and/or offset of the parameter may be derived.

The chroma block may be predicted based on the down-sampled luma block and the parameter (S840).

The chroma block may be predicted by applying at least one of a pre-derived weight or offset to a pixel of the down-sampled luma block.

Figure 9:
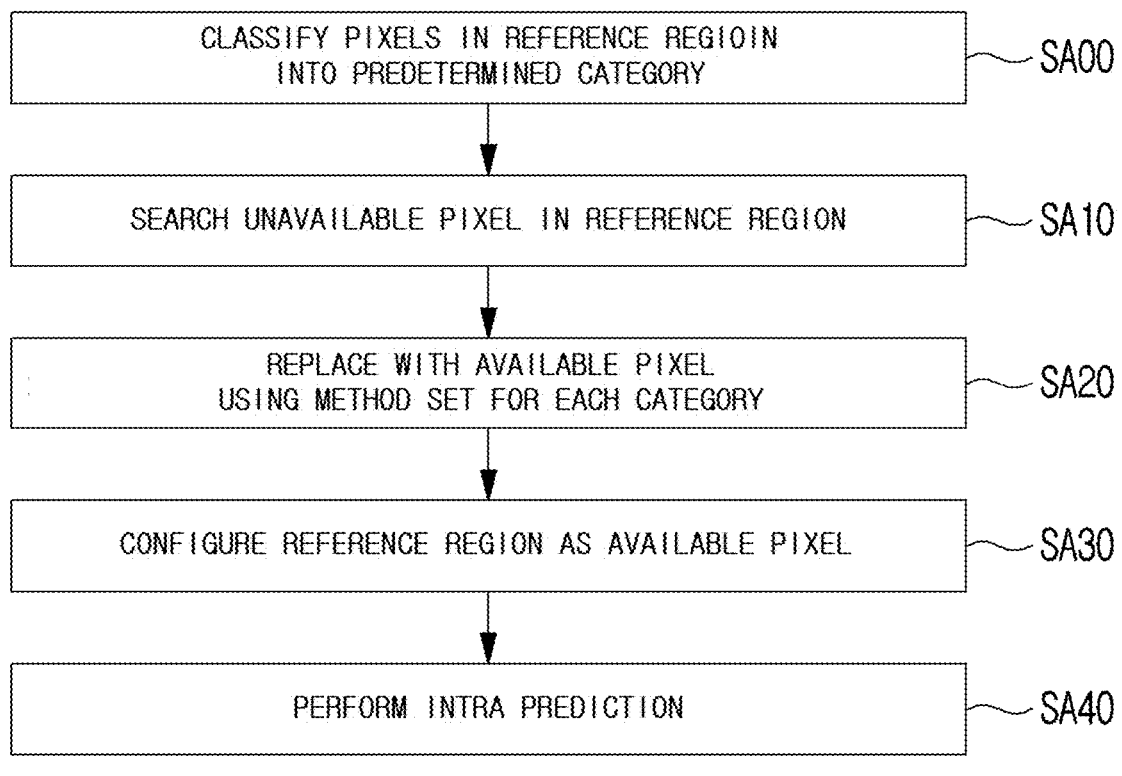
FIG. 9 illustrates a method of configuring a reference region as an embodiment to which the present invention is applied.

FIG. 9 illustrates a method of configuring a reference region as an embodiment to which the present invention is applied.

The reference region according to the present invention may be a region adjacent to the current block. Next, a method of configuring each reference region as available pixels by classifying the reference region according to categories will be described. For the convenience of explanation, the description will focus on the left, top, right reference regions of the current block. Descriptions not mentioned in the embodiments to be described later may be referenced or derived through the embodiment described with reference to FIG. 6.

Referring to FIG. 9, pixels in the reference region may be classified into a predetermined category (SA00).

The reference region may be identified/classified into k categories, and k may be an integer of 1, 2, 3 or more. Alternatively, k may be limited to an integer of 2 or less. The reference region may be classified as one of predetermined categories based on an image type (I/P/B), a component type (Y/Cb/Cr, etc.), block property (size, shape, division information, division depth, etc.), and a position of the reference pixel. Here, the block may mean a current block and/or a neighboring block of the current block.

For example, it may be classified into a predetermined category according to the size of the block. In case of the size of the block, a support range may be determined by a threshold size. Each threshold size may be expressed as W, H, W×H, and W*H based on width (W) and height (H). W and H may be natural numbers such as 4, 8, 16, 32, etc. Two or more threshold sizes are supported and may be used to set a support range such as a minimum value and a maximum value that a block may have.

Alternatively, it may be classified into a predetermined category according to the position of the reference pixel. In this case, the position of the reference pixel may be defined in units of pixels, or may be defined as a direction of a block to which the reference pixel belongs (left, right, top, bottom, top-left, top-right, bottom-left, bottom-right).

Referring to FIG. 6, it may be defined as whether it is included among the positions of the top-left pixel TL, the top-right pixel TR, the bottom-left pixel BL, and the bottom-right pixel BR. Also, it may be defined as whether it is included among the pixel positions of TL0, TL1, TR0, TR1, BL0, BL1, BR0, BR1 located based on the current block's width (2*nW), height (2*nH) or the sum of width and height (nW+nH). In addition, referring to FIG. 12, it may be defined as whether it is included among the pixel positions of T0, T3, B0, B3, L0, L3, R0, and R3, which are pixels located at both ends of a top, bottom, left, and right blocks. Alternatively, it may be defined as whether it is included among pixels (T1, L2, B2, R1, etc.) located at the middle of each block.

A reference region (reference pixel) may be classified into each category based on the various encoding elements.

Referring to FIG. 9, an unavailable pixel belonging to the reference region may be searched (SA10).

It is possible to sequentially search whether there are the unavailable pixel in the reference region. Referring to FIG. 6, the start position of the search may be determined among TL, TR, BL, and BR, but is not limited thereto. In this case, when the search is performed sequentially, the number of the start position of the search may be set to one, but for the case of parallel processing, it may be set to two or more.

The search region of the unavailable pixel may be determined based on the start position of the search. If one search position is designated (assuming TL), the top reference region or the left reference region may be searched before the right reference region, but this may not be the case in encoding setting (parallel processing).

Here, the search direction may be determined to be one of clockwise or counterclockwise. In this case, one of the clockwise or counterclockwise may be selected for the entire reference region. Alternatively, it may be adaptively selected according to the position of the reference region. That is, one search direction of the clockwise or counterclockwise may be supported for each of top/bottom/left/right reference regions. Here, it should be understood that the position of the reference region is not limited only to the width (nW) and height (nH) of the current block (i.e., including reference region included in 2*nW, 2*nH, nW+nH, etc.).

Here, in the case of a clockwise direction, it may mean a bottom to top direction in a left reference region, a left to right direction in a top reference region, a top to bottom direction in a right reference region, and a right to left direction in a bottom reference region. Counterclockwise may be derived from the opposite of the clockwise.

For example, when the search is started from the top-left pixel TL adjacent to the current block, the top reference region and the right reference region may be searched in a clockwise direction (left→right, top→bottom). In addition, the left reference region and the bottom reference region may be searched in a counterclockwise direction (top→bottom, left→right). However, the above description is only a partial example, and examples of various modifications may be possible.

Referring to FIG. 9, it may be replaced with an available pixel by using a method set for each category (SA20).

An unavailable pixel may be replaced with a predetermined default value (e.g., a median value of a pixel value range). Alternatively, it may be replaced based on a predetermined available pixel, and an unavailable pixel may be replaced with a value obtained through copying, linear extrapolation, interpolation, or the like of one or more adjacent available pixels. First, a process of classifying a category based on a position of each pixel precedes. The following is an example of how each method is applied according to a plurality of categories, and the unavailable pixel is referred to as a target pixel.

As an example <1>, when an available pixel exists in the reference region, the target pixel may be replaced by using a pixel value obtained based on the available pixel, and when no available pixel exists in the reference region, it may be replaced with a default value.

As an example <2>, when an available pixel exists before the target pixel and at the start position of the search, the target pixel may be replaced by using a pixel value obtained based on the available pixel, and when no available pixel exists before the target pixel, it may be replaced with a default value.

As an example <3>, the target pixel may be replaced with a default value.

In the case of <1>, a method of replacing with an available pixel according to whether or not an available pixel exists in the reference region is described. In the case of <2>, a method of replacing with an available pixel according to whether or not an available pixel exist during the previous search process is described. In the case of <3>, a method of replacing with one fixed available pixel is described.

If one category is supported, one method of <1> to <3> may be used. If more than one category are supported, one reference pixel belonging to any one category may select and use one of <1> to <3>, and a reference pixel belonging to another category may select and use one of <1> to <3>.

Referring to FIG. 9, the reference region may be configured as an available pixel (SA30). In addition, intra prediction may be performed (SA40).

A method of replacing with an available pixel according to categories by classifying the unavailable pixels in the reference region into categories has been described through the above-described embodiments. In addition, not only the unavailable pixel but also the available pixel may be replaced with a default value, another available pixel, or a value obtained based on other available pixel.

Figure 10:
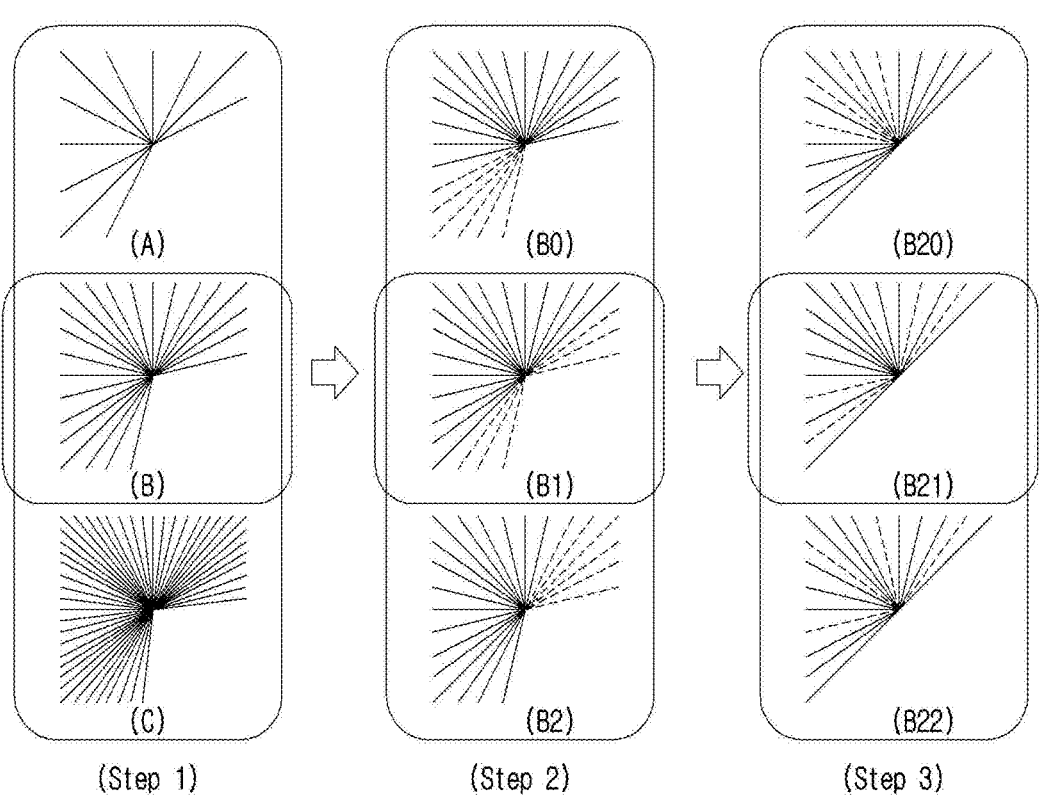
FIG. 10 is an exemplary diagram for configuring an intra prediction mode set step by step as an embodiment to which the present invention is applied.

FIG. 10 is an exemplary diagram for configuring an intra prediction mode set step by step as an embodiment to which the present invention is applied.

Referring to (Step 1) of FIG. 10, configuration of various prediction mode candidate groups may be supported, and one of them may be implicitly or explicitly selected. The prediction mode candidate group may be identified by the number of modes, slope information (dy/dx) of the directional mode, a support range of the directional mode, and the like. In this case, even if the number of modes is k (a directional, b non-directional), there may be prediction mode candidates with different a or b.

The prediction mode candidate group selection information may be explicitly generated, and may be signaled at least one level among VPS, SPS, PPS, PH, and slice header. Alternatively, a prediction mode candidate group may be implicitly selected according to the encoding setting. In this case, the encoding setting may be defined based on an image type (I/P/B), a component type, and a block property (size, shape, division information, division depth, etc.). Here, the block may mean a current block and/or a neighboring block of the current block, and in the present embodiment, the same description may be applied.

When one prediction mode candidate group is selected through (Step 1) (B is selected in this example), intra prediction or prediction mode encoding may be performed based on this. Alternatively, a process for efficient candidate group configuration may be performed, and this will be described through (Step 2).

Referring to (Step 2) of FIG. 10, the configuration of some prediction modes may be variously configured, and one of them may be implicitly or explicitly selected. (B0) to (B2) may be candidate configurations assuming that prediction modes (dotted lines in the drawing) in some directions are not well used.

Prediction mode candidate group selection information may be explicitly generated and may be signaled in a CTU, a coding block, a prediction block, a transform block, and the like. Alternatively, a prediction mode candidate group may be implicitly selected according to the encoding setting, and the encoding setting may be defined as previous various encoding elements.

Here, the shape of the block may be subdivided according to the width/height ratio (W:H) of the block, and the prediction mode candidate group may be configured differently according to all possible ratios of W:H, or according to only a certain ratio of W:H.

When one prediction mode candidate group is selected through (Step 2) (B1 is selected in this example), intra prediction or prediction mode encoding may be performed based on this. Alternatively, a process for efficient candidate group configuration may be performed, and this will be described through (Step 3).

Referring to (Step 3) of FIG. 10, it may be candidate configurations assuming that some prediction modes (dotted lines in the drawing) are not well used because the number of prediction mode candidate groups are many.

The prediction mode candidate group selection information may be explicitly generated, and may be signaled in a CTU, a coding block, a prediction block, a transform block, and the like. Alternatively, a prediction mode candidate group may be implicitly selected according to the encoding setting, and the encoding setting may be defined as previous various encoding elements. In addition, a prediction mode, a position, etc. of a block may be elements additionally considered in defining the encoding setting.

In this case, the prediction mode and the position of the block may mean information on a neighboring block adjacent to the current block. That is, based on property information of the current block and the neighboring block, a prediction mode that is estimated to be not well used may be derived, and the corresponding mode may be excluded from the prediction mode candidate group.

For example, when a neighboring block includes positions TL, T0, TR0, L0, and BL0 of FIG. 12, it is assumed that the prediction mode of the corresponding block has some directionality (from top-left to bottom-right). In this case, the prediction mode of the current block may be expected to have some directionality with a high probability, and the following processing possibility may exist.

For example, intra prediction may be performed on all modes within the prediction mode candidate group. In addition, prediction mode encoding may be performed based on the prediction mode candidate group.

Alternatively, intra prediction may be performed on a mode within a prediction mode candidate group from which some modes have been removed. In addition, prediction mode encoding may be performed based on the prediction mode candidate group from which some modes have been removed.

Comparing the above examples, it may be distinguished whether a prediction mode that is thought to have a low probability of occurrence is included in the actual prediction and encoding process (which may be included as a non-MPM, etc.) or is removed.

In the case of (B21) in which the prediction mode having a different directionality from the prediction mode of the neighboring block may be partially removed, it may be an example in which some sparsely arranged modes are removed for the case where the corresponding directional mode actually occurs.

FIGS. 11A-11D illustrates a method of classifying intra prediction modes into a plurality of candidate groups as an embodiment to which the present invention is applied.

A case of classifying into one or more candidate groups for decoding of the intra prediction mode will be described below, and it may be the same as or similar to the aforementioned MPM candidate group and non-MPM candidate group. Therefore, parts not mentioned in the present embodiment may be derived identically or similarly through the previous embodiment. In the case of the present embodiment, a method of expanding the number of candidate groups and configuring the candidate group will be described later.

The intra prediction mode of the current block may be derived by selectively using any one of a plurality of candidate groups. For this purpose, a selection flag may be used as many as (the number of candidate groups−1) or less.

For example, when the prediction mode is classified into three candidate groups (A, B, C), a flag (first flag) indicating whether the intra prediction mode of the current block is derived from the candidate group A may be used.

In this case, when the first flag is a first value, the candidate group A is used, and when the first flag is a second value, a flag (second flag) indicating whether the intra prediction mode of the current block is derived from the candidate group B may be used.

In this case, when the second flag is a first value, the candidate group B is used, and when the second flag is a second value, the candidate group C may be used. In the above example, three candidate groups are supported, and for this, a first flag and a second flag, that is, a total of two selection flags may be used.

When one of the candidate groups is selected, the intra prediction mode of the current block may be determined based on the candidate group and a candidate group index. The candidate group index may be information specifying any one of candidates belonging to the candidate group. The candidate group index may be signaled only when a plurality of candidates belong to the candidate group.

The configuration of the selection flag when three candidate groups are supported has been described through the above example. As in the above configuration, flags indicating whether the prediction mode of the current block is derived from a candidate group having a high priority may be sequentially supported (e.g., in the order of a first flag→a second flag). That is, when a predetermined candidate group selection flag is generated and a corresponding candidate group is not selected, the selection flag of candidate group having the next priority may be generated.

Alternatively, it may be a configuration having a different meaning from the selection flag (EE). For example, a flag (first flag) indicating whether the intra prediction mode of the current block is derived from the candidate groups A or B may be used.

In this case, when the first flag is a first value, the candidate group C is used, and when the first flag is a second value, a flag (second flag) indicating whether the intra prediction mode of the current block is derived from the candidate group A may be used.

In this case, when the second flag is a first value, the candidate group A may be used, and when the second flag is a second value, the candidate group B may be used.

Each of candidate groups A, B, and C may have m, n, and p candidates, and m may be an integer of 1, 2, 3, 4, 5, 6 or more. n may be an integer of 1, 2, 3, 4, 5, 6 or more. Alternatively, n may be an integer between 10 and 40. p may be (the total number of prediction modes-m-n). Here, m may be less than or equal to n, and n may be less than or equal to p.

As another example, when the prediction mode is classified into four candidate groups (A, B, C, D), flags indicating whether the intra prediction mode of the current block is derived from the candidate groups A, B, C (first flag, second flag, third flag) may be used.

In this case, the second flag may be generated when the first flag is the second value, and the third flag may be generated when the second flag is the second value. That is, when the first flag is the first value, the candidate group A may be used, and when the second flag is the first value, the candidate group B may be used. In addition, when the third flag is the first value, the candidate group C may be used, and when the third flag is the second value, the candidate group D may be used. In this example, the opposite configuration is also possible as in some examples (EE) of the configuration of three candidate groups.

Alternatively, the second flag may be generated when the first flag is the first value, and the third flag may be generated when the first flag is the second value. When the second flag is the first value, the candidate group A may be used, and when the second flag is the second value, the candidate group B may be used. When the third flag is the first value, the candidate group C may be used, and when the second value is the second value, the candidate group D may be used.

Each of candidate groups A, B, C, and D may have m, n, p, and q candidates, and m may be an integer of 1, 2, 3, 4, 5, 6 or more. n may be an integer of 1, 2, 3, 4, 5, 6 or more. Alternatively, n may be an integer between 8 and 24. p may be an integer such as 6, 7, 8, 9, 10, 11, 12, and the like. Alternatively, p may be an integer between 10 and 32. q may be (the total number of prediction modes-m-n-p). Here, m may be less than or equal to n, n may be less than or equal to p, and p may be less than or equal to q.

Next, when multiple candidate groups are supported, a method of configuring each candidate group will be described. The reason for supporting a plurality of candidate groups is for the purpose of efficient intra prediction mode decoding. That is, a prediction mode that is expected to be the same as the intra prediction mode of the current block is configured as a candidate group with a high priority, and the prediction mode that is not expected to be the same as the intra prediction mode of the current block is configured as a candidate group with a low priority.

Figure 11:
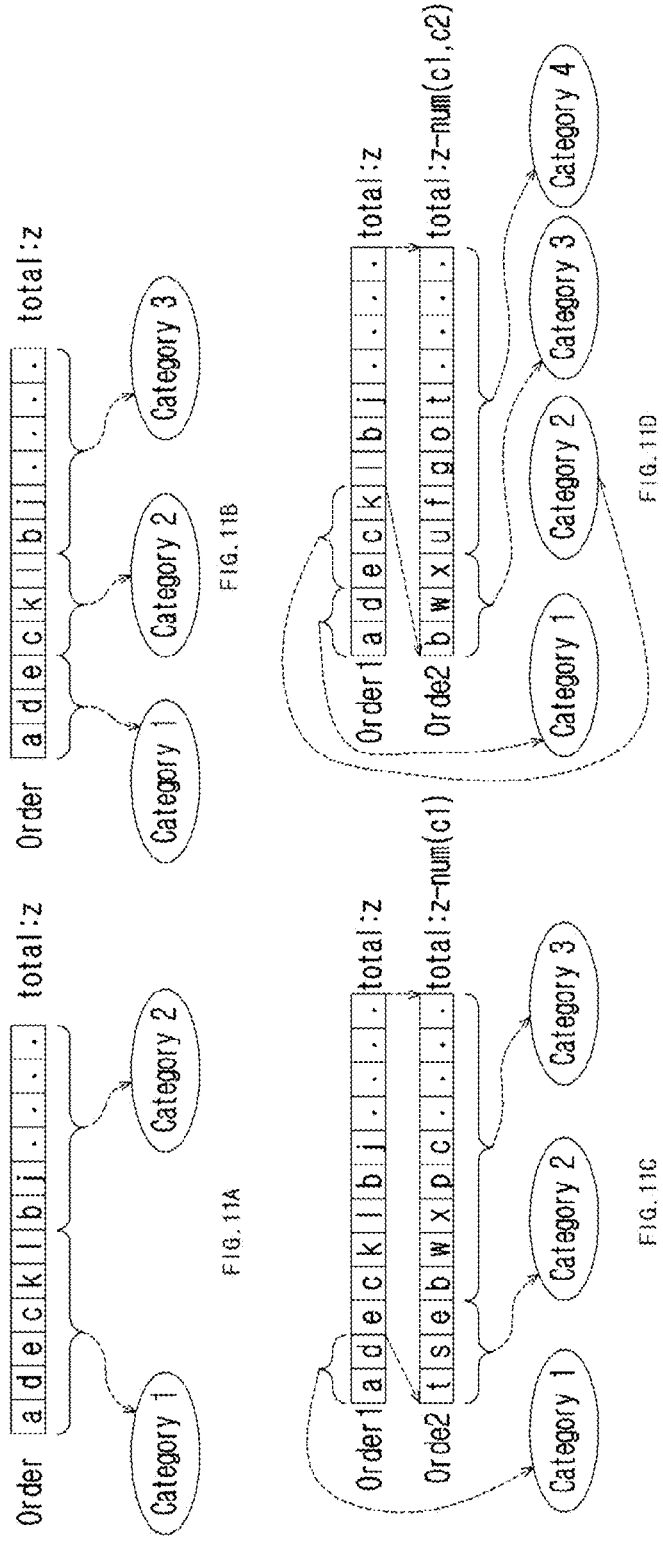
FIGS. 11A-11D illustrates a method of classifying intra prediction modes into a plurality of candidate groups as an embodiment to which the present invention is applied.

For example, in FIGS. 11-A11D, when category 2(a), category 3(b and c), and category 4(d) are the candidate groups with the lowest priority, respectively, the candidate groups may be configured using a prediction mode that is not included in any of the candidates with the previous priority. In this embodiment, since the candidate group is composed of the remaining prediction modes that are not included in the preceding candidate group, it is assumed that it is the candidate group irrelevant to the priority between the prediction modes configuring each candidate group to be described later (i.e., the remaining prediction modes that are not included in the previous candidate group without considering the priority). And, it is assumed that the priority (priority) between candidate groups is in ascending order (category 1→category 2→category 3→category 4) as shown in FIGS. 11D, and the priority in the examples described later is a term used in listing modes to configure each candidate group.

Like the aforementioned MPM candidate group, a candidate group may be configured with a prediction mode of a neighboring block, a default mode, a predetermined directional mode, or the like. For the purpose of assigning a less amount of bits to the prediction mode with the highest probability of occurrence, a candidate group may be configured by determining a predetermined priority for configuring a candidate group.

Referring to FIG. 11A, a priority for a first candidate group (Category 1) may be supported. When the first candidate group is configured based on the number of the first candidate group according to the priority, the remaining prediction modes (b, j, etc.) may be configured as a second candidate group (Category 2).

Referring to FIG. 11B, common priority for the first candidate group and the second candidate group may be supported. According to the priority, the first candidate group is configured based on the number of the first candidate group. The second candidate group is configured based on the number of the second candidate group according to the priority (after c) after the prediction mode (e) finally included in the first candidate group. In addition, the remaining prediction modes (b, j, etc.) may be configured as a third candidate group (Category 3).

Referring to FIG. 11C, individual priorities (first priority, second priority) for the first candidate group and the second candidate group may be supported. The first candidate group is configured based on the number of the first candidate group according to a first priority. Then, the second candidate group is configured based on the number of the second candidate group according to a second priority. In addition, the remaining prediction modes (b, w, x, etc.) may be configured as the third candidate group.

Here, the second priority may be set based on a prediction mode of the neighboring block <1>, a default mode <2>, a predetermined directional mode <3>, and the like, like the existing priority (first priority). However, the priority may be set based on an importance different from the first priority (e.g., if the first priority is configured in the order of 1-2-3, the second priority is configured in the order of 3-2-1, etc.). In addition, the second priority may be variably configured according to the mode included in the previous candidate group, and may be affected by the mode of the neighboring block of the current block. The second priority may be configured differently from the first priority, but it may be understood that the configuration of the second priority may be partially affected by the configuration of the first candidate group. In this paragraph, it should be understood that the first priority (previous ranking), the first candidate group (previous candidate group), and the second priority (current ranking) and the second candidate group (current candidate group) are not described in a fixed ranking such as a number.

Referring to FIG. 11D, a common priority (first priority) for the first candidate group and the second candidate group may be supported, and individual priority (second priority) for the third candidate group may be supported. The first candidate group is configured based on the number of the first candidate group according to the first priority. The second candidate group is configured based on the number of the second candidate group according to the priority (after e) after the prediction mode (d) finally included in the first candidate group. Then, according to the second priority, the third candidate group is configured based on the number of the third candidate group. In addition, the remaining prediction modes (u, f, etc.) may be configured as the fourth candidate group.

According to an embodiment of the present invention, in case of the intra prediction mode of the current block, the prediction modes may be configured with one or more candidate groups, and a prediction mode decoding may be performed based on this. In this case, one or more priorities used for configuring the candidate group may be supported. The priority may be used in the process of configuring one or more candidate groups.

In the above example, when two or more priorities are supported, a priority (second priority) separate from the priority (first priority) used in the preceding candidate group (first candidate group) is used for another candidate group (the second candidate group). This may correspond to the case where all candidates in one candidate group are configured according to one priority.

In addition, the first priority used for the first candidate group may be used to configure some candidates of the second candidate group. That is, some candidates (cand_A) of the second candidate group may be determined based on the first priority (starting from a mode not included in the first candidate group), and some candidates (or remaining candidates. cand_B) of the second candidate group may be determined based on the second priority. In this case, cand_A may be an integer of 0, 1, 2, 3, 4, 5 or more. That is, when configuring the first candidate group, a prediction mode that is not included in the first candidate group may be included in the second candidate group.

For example, three candidate groups are supported, and the first candidate group consists of two candidates, and the first priority may be determined among a prediction mode of an adjacent block (e.g., left, top), a predetermined directional mode (e.g., Ver, Hor, etc.), a predetermined non-directional mode (e.g., DC, Planar, etc.) (e.g., Pmode_L-Pmode_U-DC-Planar-Ver-Hor, etc.). The candidate group is configured based on the number of the first candidate group according to the first priority (e.g., Pmode_L, Pmode_U).

In this case, the second candidate group is configured with 6 candidates, and the second priority may be determined among a directional mode having a predetermined interval (1, 2, 3, 4 or more integer) from the prediction mode of the adjacent block and a directional mode having a predetermined slope (dy/dx. 1:1, 1:2, 2:1, 4:1, 1:4, etc.) (e.g., Diagonal down left-Diagonal down right-Diagonal up right-<Pmode_L+2>, <Pmode_U+2>, etc.).

The second candidate group may be configured based on the number of the second candidate group according to a second priority. Alternatively, two candidates of the second candidate group may be configured (DC, Planar) based on a first priority, and the remaining four candidates may be configured (DDL, DDR, DUR) based on a second priority.

For convenience of explanation, the same terms as the previous description are used, such as the first candidate group, the second candidate group, and the first priority, but it should be noted that the priority between the candidate groups among the plurality of candidate groups is not fixed to the first and second.

In summary, when it is classified into a plurality of candidate groups for prediction mode decoding and one or more priorities are supported, a predetermined candidate group may be configured based on one or more priorities.

FIG. 12 is an exemplary diagram illustrating a current block and a pixel adjacent thereto as an embodiment to which the present invention is applied.

Referring to FIG. 12, pixels (a to p) belonging to a current block and pixels adjacent thereto are shown. In detail, it represents pixels (Ref_T, Ref_L, Ref_TL, Ref_TR, and Ref_BL) that are adjacent to the current block and referenceable, and pixels (B0 to B3, R0 to R3, BR) that are adjacent to the current block, but are not referenceable. This is a diagram assuming that some coding order, scan order, etc. are fixed (the left, top, top-left, top-right, and bottom-left blocks of the current block may be referred to), and it is possible to change into a different configuration according to the change of the encoding setting.

Figure 13:
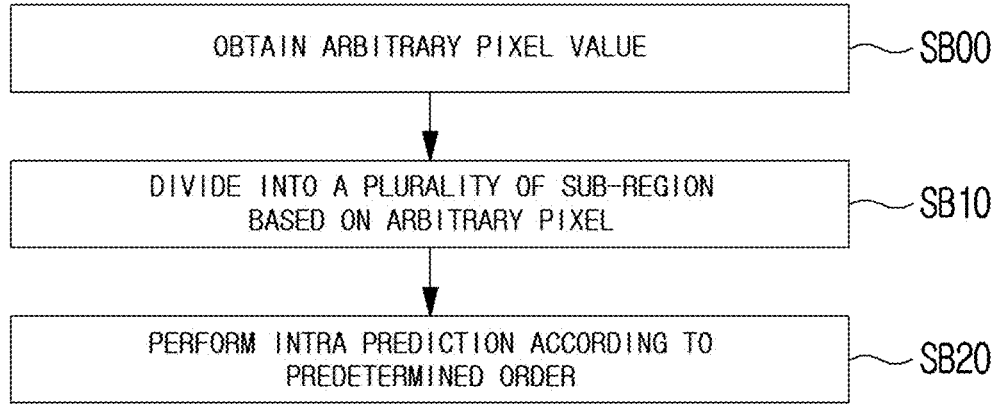
FIG. 13 illustrates a method of performing intra prediction step by step as an embodiment to which the present invention is applied.

FIG. 13 illustrates a method of performing intra prediction step by step as an embodiment to which the present invention is applied.

The current block may perform intra prediction using pixels located in the left, right, top, and bottom directions. In this case, as shown in FIG. 12, not only pixels that can be referenced but also pixels that cannot be referenced may exist. Encoding efficiency may be improved by estimating pixel values not only for referenceable pixels but also for non-referenceable pixels and using them.

Referring to FIG. 13, an arbitrary pixel value may be obtained (SB00).

Here, the arbitrary pixel may be a pixel that cannot be referenced around the current block or a pixel inside the current block. An arbitrary pixel position will be described with reference to the following drawing.

Figure 14:
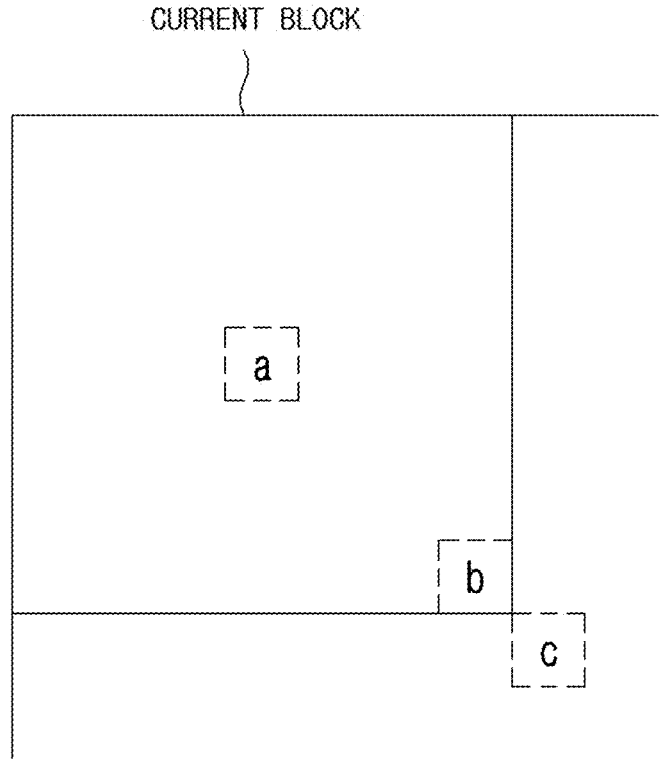
FIG. 14 is an exemplary diagram for an arbitrary pixel for intra prediction as an embodiment to which the present invention is applied.

FIG. 14 is an exemplary diagram for an arbitrary pixel for intra prediction as an embodiment to which the present invention is applied.

Referring to FIG. 14, not only a pixel (c) located outside the current block and cannot be referenced, but also a pixel (a, b) located inside the current block may be the arbitrary pixel. The following assumes that the size of the current block is Width×Height and a top-left coordinate is (0, 0).

In FIG. 14, a and b may be located in (0, 0) to (Width−1, Height−1).

For example, it may be located on the boundary line (left, right, top, bottom) of the current block. For example, it may be located in the right column of the current block, (Width−1, 0) to (Width−1, Height−1) or the bottom row of the current block, (0, Height−1) to (Width−1, Height−1).

For example, it may be located in odd or even column and row of the current block. For example, it may be located in an even row of the current block or it may be located in an odd column of the current block. Alternatively, it may be located in an even row and an odd column of the current block, or may be located in an odd row and an odd column of the current block. Here, in addition to the odd or even number, it may be located in a column or row corresponding to a multiple of k or an exponent (2k), and k may be an integer of 1, 2, 3, 4, 5 or more.

In FIG. 14, c may be located outside the referenceable pixel and the current block.

As an example, it may be located on the boundary line of the current block (in this example, right, bottom). For example, it may be located on the right boundary of the current block, (Width, 0) to (Width, Height), or the bottom boundary of the current block, (0, Height) to (Width, Height).

For example, it may be located in odd or even column and row of the current block. For example, it may be located in an even row beyond the right boundary of the current block, or it may be located in an odd column beyond the bottom boundary of the current block. Here, in addition to the odd or even number, it may be located in a column or row corresponding to a multiple of k or an exponent (2k), and k may be an integer of 1, 2, 3, 4, 5 or more.

The number of arbitrary pixels used/referenced for intra prediction of the current block may be m, and m may be 1, 2, 3, 4 or more. Alternatively, the number of arbitrary pixels may be set based on the size (width or height) of the current block. For example, the number of arbitrary pixels used for intra prediction may be Width/w_factor, Height/h_factor, or (Width*Height)/wh_factor. Here, w_factor and h_factor may be pre-determined values used as division values based on the width and height of each block, and may be integers such as 1, 2, 4, and 8. Here, wh_factor may be a pre-determined value used as a division value based on the size of the block, and may be an integer such as 2, 4, 8, 16, and the like.

Also, the number of arbitrary pixels may be determined based on all or some of encoding elements such as an image type, a component type, a block property, and an intra prediction mode.

An arbitrary pixel obtained through the above process may be obtained from a region which can refer to a corresponding pixel value. For example, a pixel value may be obtained based on a referenceable pixel located in a horizontal or vertical direction of an arbitrary pixel.

In this case, a pixel value of an arbitrary pixel may be obtained as a value obtained through copy or weight average using one or more pixels (k. k is an integer of 1, 2, 3, 4, 5, 6, etc.) located in (<1> horizontal direction/<2> vertical direction). In the (<1> horizontal direction/<2> vertical direction), a referenceable pixel having the same or similar (<1> y component/<2> x component) among the coordinates of an arbitrary pixel may be used/referenced to obtain a pixel value. However, in a broad sense, a referenceable pixel located in the (<1> left direction/<2> top direction) of the current block may be used to obtain a pixel value of an arbitrary pixel.

A pixel value may be obtained based on either the horizontal direction or the vertical direction, or may be obtained based on both directions. In this case, a pixel value acquisition setting may be determined based on various encoding elements (described in the above example, such as an image type and a block property).

For example, when the current block has a rectangular shape having a width greater than a height, a pixel value of an arbitrary pixel may be obtained based on a referenceable pixel located in the vertical direction. Alternatively, when primary pixel values are obtained based on each of referenceable pixels located in the vertical direction and the horizontal direction, a secondary pixel value (i.e., a pixel value of an arbitrary pixel) may be obtained by applying further a weight to the primary pixel value obtained in the vertical direction rather than the primary pixel value obtained in the horizontal direction.

Alternatively, when the current block has a rectangular shape having a height greater than a width, a pixel value of an arbitrary pixel may be obtained based on a referenceable pixel located in the horizontal direction. Alternatively, when primary pixel values are obtained based on each of referenceable pixels located in the vertical direction and the horizontal direction, a secondary pixel value (i.e., a pixel value of an arbitrary pixel) may be obtained by applying further a weight to the primary pixel value obtained in the horizontal direction rather than the primary pixel value obtained in the vertical direction. Of course, it is not limited to the above example, and the opposite configuration may also be possible.

In addition, a predetermined candidate list may be configured and a pixel value of an arbitrary pixel may be obtained by selecting at least one of them. It may be signaled in one of units such as a CTU, a coding block, a prediction block, and a transform block. In this case, the candidate list may be configured with a pre-determined value or may be configured based on the above-described referenceable pixel adjacent to current block. In this case, the number of candidate lists may be an integer of 2, 3, 4, 5 or more. Alternatively, it may be an integer between 10 and 20, an integer between 20 and 40, or an integer between 10 and 40.

Here, in the candidate list, a pixel value may be configured as a candidate, or an equation for inducing the pixel value, a feature value, and the like may be configured as a candidate. In the latter case, various pixel values may be derived in an arbitrary pixel unit based on an equation for obtaining a position (x- or y-coordinate) of an arbitrary pixel and a pixel value or the feature value.

As described above, one or more arbitrary pixels may be obtained, and intra prediction may be performed based on them. In the following, for convenience of explanation, it is assumed that the number of arbitrary pixels is 1. However, it is clear that the example described later may be extended to the same or similar case even when two or more arbitrary pixels are obtained.

Referring to FIG. 13, it may be divided into a plurality of sub-regions based on an arbitrary pixel (SB10).

Here, the sub-regions may be partitioned based on a horizontal or vertical line including the arbitrary pixel, and the number of sub-regions may be an integer of 2, 3, 4 or more. The configuration of the sub-region will be described with reference to the following drawing.

Figure 15:
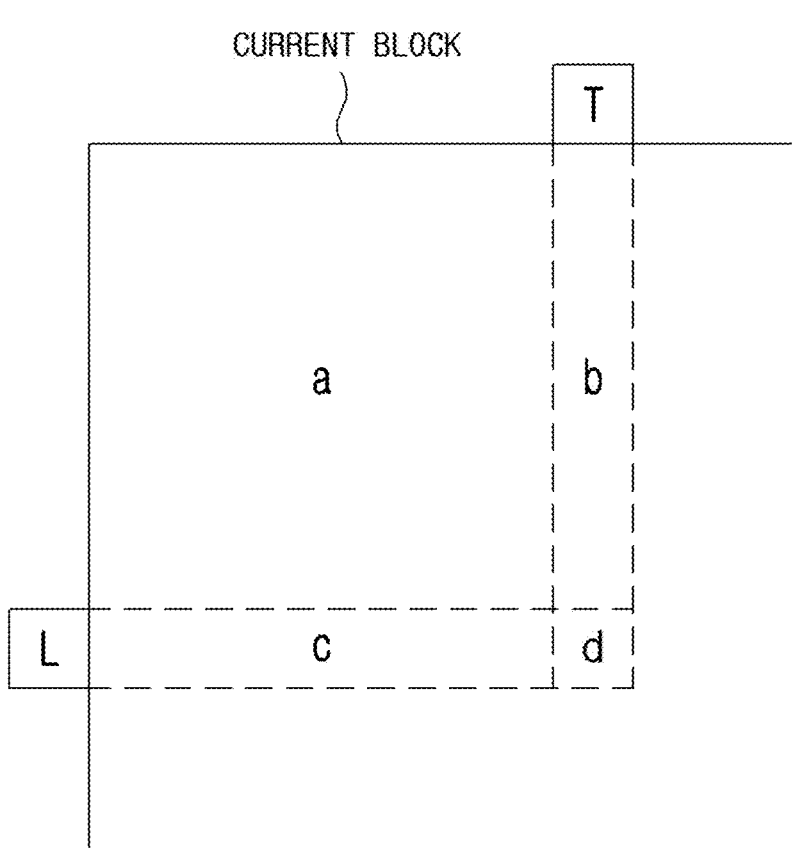
FIG. 15 is an exemplary diagram of dividing into a plurality of sub-regions based on an arbitrary pixel as an embodiment to which the present invention is applied.

FIG. 15 is an exemplary diagram of dividing into a plurality of sub-regions based on an arbitrary pixel as an embodiment to which the present invention is applied.

Referring to FIG. 15, a predetermined sub-region (b, c), which is a vertical or horizontal line of an arbitrary pixel d, may be obtained, and a predetermined sub-region (a) may be obtained based on vertical and horizontal lines.

In this case, a sub-region (b) may be obtained between an arbitrary pixel and a pixel T that can be referenced in a vertical direction, and a sub-region (c) may be obtained between an arbitrary pixel and a pixel L that can be referenced in a horizontal direction. In this case, the sub-regions b and c may not always occur fixedly, and only one of the two may occur according to an arbitrary pixel-related setting of the current block (e.g., b or c is also an arbitrary pixel, etc.). If only one of the sub-regions b and c occurs, the sub-region a may not be occurred.

As shown in FIG. 15, T or L may refer to a referenceable pixel adjacent to the current block. Alternatively, T or L may refer to any pixel (e, f) different from d located in the vertical or horizontal direction of the arbitrary pixel (d). This means that any pixel d may also be a T or L of any other pixel.

As in the above example, the size of the sub-region may be determined based on the number and arrangement of arbitrary pixels in the current block.

For example, when two or more arbitrary pixels exist and are located at intervals of one slot, each of the sub-regions a, b, and c may have a size of 1×1. Alternatively, when one arbitrary pixel exists and is located at c of FIG. 14, sub-regions a, b, and c may have a size of (Width×Height), (1×Height), and (Width×1), respectively.

Referring to FIG. 13, intra prediction may be performed according to a predetermined order (SB20).

Here, according to a position of an arbitrary pixel, some sub-regions may be used as a prediction value for intra prediction or may be used as a temporary reference value for intra prediction.

For example, when an arbitrary pixel (or sub-region d) is located at c of FIG. 14, sub-regions b and c are located outside the current block, and only sub-region a may be a target of intra prediction. Alternatively, when an arbitrary pixel is located above c of FIG. 14, the sub-region b is located outside the current block, and the sub-regions a and c may be targets of intra prediction. Alternatively, when an arbitrary pixel is located on the left side of c of FIG. 14, the sub-region c is located outside the current block, and the sub-regions a and b may be targets of intra prediction. Alternatively, when an arbitrary pixel is located inside the current block, sub-regions a, b, and c may be targets of intra prediction.

As in the above example, according to the position of an arbitrary pixel, it may be the target of intra prediction or may be used as a temporary reference value.

The following description assumes a case in which an arbitrary pixel is located inside the current block, but even if a change to the position occurs, the following example may be applied and understood in the same or similar manner.

Since a position and a pixel value of the arbitrary pixel are obtained through the previous steps, each sub-region acquisition process may be performed according to a predetermined priority among the sub-regions a, b, and c. For example, a pixel value of each sub-region may be obtained in the order of b→c or c→b, and a pixel value of sub-region a may be obtained.

In the case of the sub-region b, a pixel value may be obtained based on an arbitrary pixel d or T. In the case of the sub-region c, a pixel value may be obtained based on an arbitrary pixel d or L.

Although not shown in the drawing, assume that the top-left pixel is TL (i.e., the intersection of the horizontal line of T and the vertical line of L). When TL and T are located on the top of the current block, a pixel between TL and T may be referred to. Also, when TL and L are located on the left side of the current block, a pixel between TL and L may be referred to. It is because the referenceable pixel belongs to a block adjacent to the current block.

On the other hand, when at least one TL or T is located inside the current block, a pixel between TL and T may be referred to. In addition, when at least one of TL or L is located inside the current block, a pixel between TL and L may be referred to. It is because the referenceable pixel may be a sub-region obtained based on another arbitrary pixel.

Therefore, in the case of the sub-region a, a pixel value may be obtained based on the sub-regions b and c, the referenceable region between TL and T, and the referenceable region between TL and L. Of course, TL, T, L, and d may be used to obtain pixel values of the sub-region a. Here, it means that any pixel may be also referred.

Through the above process, intra prediction of the current block may be performed based on the arbitrary pixel.

Performing intra prediction based on the arbitrary pixel may be configured as one of the intra prediction modes or may be included as a replacement for an existing mode.

Alternatively, it may be classified as one candidate of prediction methods and selection information for this may be generated. For example, it may be considered as an additional prediction method to a method of performing intra prediction based on a directional mode or a non-directional mode. The selection information may be signaled in a CTU, a coding block, a prediction block, a transform block, or the like.

The following will be described on the assumption that the arbitrary pixel position is c of FIG. 14. However, the present invention is not limited thereto, and the contents described below may be applied in the same or similar manner even when arranged in different positions. The following will be described with reference to FIG. 12.

Although the current block and the right and bottom blocks of the current block have not been encoded, they may be estimated based on data of a referenceable region.

For example, data may be copied or derived from Ref_TR, Ref_BL, etc., which are regions adjacent to the right and lower boundaries of the current block, and then the right or lower boundary of the current block may be filled with the data. As an example, the right boundary may be filled by copying one of pixels such as T3, TR0, and TR1 as it is, or with a value obtained by applying filtering to T3, TR0, and TR1.

Alternatively, data may be copied or derived from Ref_TL, Ref_T, Ref_L, Ref_TR, Ref_BL, etc., which are regions adjacent to the current block, and the bottom-right boundary of the current block may be filled with the data. For example, a bottom-right boundary of the current block may be filled with a value obtained based on one or more pixels in the adjacent region.

Here, the right boundary of the current block may be (d~p) or (R0~R3). The bottom boundary of the current block may be (m~p) or (B0~B3). The bottom-right boundary of the current block may be one of p, BR, R3, and B3.

In the following example, it is assumed that the right boundary is R0~R3, the bottom boundary is B0~B3, and the bottom-right boundary is BR.
(Processing for Right Boundary and Bottom Boundary)

For example, the right boundary may be filled by copying one of T3, TR0, and TR1 adjacent to the vertical direction, and the bottom boundary may be filled by copying one of L3, BL0, and BL1 adjacent to the horizontal direction.

Alternatively, the right boundary may be filled with a weight average value of T3, TR0, and TR1 adjacent to the vertical direction, and the bottom boundary may be filled with a weight average value of L3, BL0 and BL1 adjacent to the horizontal direction.

After obtaining values of the right boundary and the bottom boundary, intra prediction of the current block may be performed based on the values.
(Processing for Bottom-Right Boundary)

For example, the bottom-right border may be filled by copying one of T3, TR0, TR1, L3, BL0, and BL1. Alternatively, it may be filled with a weight average value of one of T3, TR0, and TR1 and one of L3, BL0, and BL1. Alternatively, it may be filled with one of a weight average value of T3, TR0, and TR1 and a weight average value of L3, BL0, and BL1. Alternatively, it may be filled with a second weight average value of a first weight average value of T3, TR0, and TR1 and a first weight average of L3, BL0, and BL1.

After obtaining the value of the bottom-right boundary, a value of the right boundary or the bottom boundary may be obtained based on the value, and intra prediction of the current block may be performed based on the right boundary or the bottom boundary.

The following continues the description of the bottom-right boundary processing.

Assume a configuration that considers the positions of TL, TR0, BL0, and BR. Here, BR may mean a pixel at the bottom-right boundary, TR0 may be a referenceable pixel located in the vertical direction of the BR, BL0 may be a referenceable pixel located in the horizontal direction of the BR, and TL may be a referenceable pixel located at the top-left boundary of the current block or an intersection between the horizontal direction of TR0 and the vertical direction of BL0.

Based on the pixel position, the directionality of the current block and feature information (e.g., edge, etc.) may be estimated.

As an example <1>, the pixel value may gradually increase or decrease when moving diagonally from TL to BR. In this case, if TL is greater than or equal to TR0 and BL0, BR may be less than or equal to TR0 and BL0. Alternatively, it may be the opposite configuration.

As an example <2>, the pixel value may gradually increase or decrease when moving diagonally from BL0 to TR0. In this case, if BL0 is greater than or equal to TL and BR, TR0 may be less than or equal to TL and BR. Alternatively, it may be the opposite configuration.

As an example <3>, the pixel value may gradually increase or decrease when moving in the horizontal direction from the left (TL, BL0) to the right (TR0, BR). In this case, if TL is greater than or equal to TR0, BL0 may be greater than or equal to BR. Alternatively, it may be the opposite configuration.

As an example <4>, the pixel value may be gradually evidenced or decreased when moving in the vertical direction from the top (TL, TR0) to the bottom (BL0, BR). In this case, if TL is greater than or equal to BL0, TR0 may be greater than or equal to BR. Alternatively, it may be the opposite configuration.

If the image feature as in the above example exists in the current block, the bottom-right boundary may be predicted using this. In this case, a pixel located in the vertical or horizontal direction of the estimation target pixel and a pixel that is an intersection point in the vertical or horizontal direction of each pixel may be required, and the estimation target pixel may be predicted based on comparison of pixel values thereof.

<1> Example: When TL <=TR0 and TL <=BL0, the BR value may be derived (predicted) based on the difference between pixels by estimating that there is a tendency to increase from TL to BR.

For example, a BR pixel value may be derived by adding a value of (BL0-TL) to TR0 or by adding a value of (TR0-TL) to BL0. Alternatively, a BR pixel value may be derived by averaging or weight-averaging said two values.

<2> Example: When TL>=BL0 and TL <=TR0, a BR value may be derived based on the difference between pixels by estimating that there is a tendency to increase from BL0 to TR0.

For example, a BR The pixel value may be derived by subtracting the (TL-BL0) value from TR0 or by adding the (TR0-TL) value to BL0. Alternatively, a BR pixel value may be derived by averaging or weight-averaging said two values.

In the above example, a case in which an arbitrary pixel BR is predicted by estimating a characteristic of a block based on a predetermined pixel adjacent to the current block has been described. Meanwhile, it may be difficult to accurately seize the characteristics of a block due to the limited pixel. For example, when an impulse component is present in some of the pixels referenced to induce the BR, it may be difficult to accurately seize features.

To this end, characteristic information (e.g., variance, standard deviation, etc.) of the top region and the left region of the current block may be calculated. As an example, if it is determined that the characteristic information of the pixels between TL and TR0 or the characteristic information of the pixels between TL and BL0 reflects the increase or decrease of the block well, a method of deriving a value of an arbitrary pixel such as BR based on the predetermined pixel of the current block such as TL, TR0, BL0, etc. may be used.

The various embodiments of the disclosure are not intended to be all-inclusive and are intended to illustrate representative aspects of the disclosure, and the features described in the various embodiments may be applied independently or in a combination of two or more.

In addition, various embodiments of the present disclosure may be implemented by hardware, firmware, software, or a combination thereof. In the case of hardware implementation, the hardware may be implemented by one or more application specific integrated circuits (ASICs), digital signal processors (DSPs), digital signal processing devices (DSPDs), programmable logic devices (PLDs), field programmable gate arrays (FPGAs), general processor, a controller, a micro-controller, a micro-processor, and the like.

The scope of the present disclosure includes a software or machine-executable instructions (e.g., operating system, applications, firmware, program, etc.) which makes operations according to the methods of the various embodiments be performed on the apparatus or computer and a non-transitory computer-readable medium, in which such software or instructions are stored, executable on the apparatus or computer.

INDUSTRIAL AVAILABILITY

The present invention may be used to encode/decode a video signal.

The invention claimed is:

1. A method of decoding an image based on an intra prediction with a decoding apparatus, comprising:
   determining an intra prediction mode of a current chroma block; and predicting the current chroma block based on the intra prediction mode of the current chroma block,
   wherein determining an intra prediction mode of the current chroma block comprises:
   selecting one of a first mode group and a second mode group based on a first flag signaled from the encoding apparatus, the first mode group including only inter-components reference-based prediction modes, the second mode group including 67 intra prediction modes pre-defined in the decoding apparatus, the 67 intra prediction modes being composed of 2 non-directional modes and 65 directional modes, and the first flag specifying whether the intra prediction mode of the chroma block belongs to the first mode group or the second mode group; and
   deriving the intra prediction mode of the current chroma block from the selected mode group, and
   wherein the second mode group comprises a DC mode, a planar mode, a vertical mode, and a horizontal mode.

2. The method of claim 1, wherein in response to the selection that the intra prediction mode of the current chroma block is derived from the second mode group, the intra prediction mode of the current chroma block is determined based on an intra prediction mode of a current luma block corresponding to the current chroma block.

3. The method of claim 2, wherein when the intra prediction mode of the luma block is unavailable, the intra prediction mode of the current luma block is set equal to an intra prediction mode pre-defined in the decoding apparatus.

4. The method of claim 2, wherein a reference pixel line for the current luma block is determined based on index information signaled from the encoding apparatus and a plurality of reference pixel line candidates,
   wherein the index information specifies one of the plurality of reference pixel line candidates, and
   wherein the plurality of reference pixel line candidates include at least one of a first pixel line adjacent to the current luma block, a second pixel line adjacent to the first pixel line, or a third pixel line adjacent to the second pixel line.

5. The method of claim 4, wherein determining an intra prediction mode of the current luma block comprises:
   selecting one of a first MPM candidate group and a second MPM candidate group based on a second flag signaled from an encoding apparatus, the first MPM candidate group including only at least one non-directional mode, the second candidate group including only a plurality of MPM candidates of directional modes, and the second flag specifying whether the intra prediction mode of the current luma block belongs to the first MPM candidate group or the second MPM candidate group; and
   deriving the intra prediction mode of the current luma block from the selected one.

6. The method of claim 5, wherein when the intra prediction mode of the current luma block is derived from the first MPM candidate group, the current luma block is predicted using only the first pixel line adjacent to the current luma block.

7. A method of encoding an image based on an intra prediction with an encoding apparatus, comprising:
   determining an intra prediction mode of a current chroma block; and
   predicting the current chroma block based on the intra prediction mode of the current chroma block,
   wherein the intra prediction mode of the current chroma block belongs to one of a first mode group and a second mode group, the first mode group including only inter-components reference-based prediction modes, the second mode group including 67 intra prediction modes pre-defined in the encoding apparatus, the 67 intra prediction modes being composed of 2 non-directional modes and 65 directional modes, wherein a first flag for specifying whether the intra prediction mode of the current chroma block belongs to the first mode group or the second mode group is encoded and is included in the bitstream, wherein the current chroma block is predicted by a current luma block that is corresponding to the current chroma block, when the intra prediction mode of the current chroma block is derived from the first mode group, and wherein the second mode group comprises a DC mode, a planar mode, a vertical mode, and a horizontal mode.

8. A bitstream transmitting method to transmit a bitstream comprising:

generating the bitstream by encoding an image based on an image encoding method; and transmitting the bitstream, and wherein the image encoding method comprising:

determining a reference pixel line for the intra prediction of a current block in the image;

determining an intra prediction mode of the current block;

obtaining a residual block of the current block based on an original block of the current block and a prediction block of the current block, the prediction block being obtained based on the reference pixel line and the intra prediction mode; and encoding the residual block to generate the bitstream of the encoded image, wherein the current block includes a luma block and a chroma block, and the intra prediction mode of the current block is determined for the luma block and the chroma block, respectively, wherein the intra prediction mode of the current chroma block belongs to one of a first mode group and a second mode group, the first mode group including only inter-components reference-based prediction modes, the second mode group including 67 intra prediction modes pre-defined in the encoding apparatus, the 67 intra prediction modes being composed of 2 non-directional modes and 65 directional modes, and wherein a first flag for specifying whether the intra prediction mode of the current chroma block belongs to the first mode group or the second mode group is encoded and is included in the bitstream, wherein the current chroma block is predicted by a current luma block that is corresponding to the current chroma block, when the intra prediction mode of the current chroma block is derived from the first mode group, wherein the second mode group comprises a DC mode, a planar mode, a vertical mode, and a horizontal mode, and wherein the second mode group comprises an intra prediction mode of a current luma block that is corresponding to the current chroma block.

* * * * *